US011643184B2

(12) United States Patent
Behzadpour et al.

(10) Patent No.: US 11,643,184 B2
(45) Date of Patent: May 9, 2023

(54) WING ASSEMBLY HAVING DISCRETELY STIFFENED COMPOSITE WING PANELS

(71) Applicant: The Boeing Company, Chicago, IL (US)

(72) Inventors: Forouzan Behzadpour, Woodinville, WA (US); Daniel M. Levine, Seattle, WA (US)

(73) Assignee: The Boeing Company, Arlington, VA (US)

( * ) Notice: Subject to any disclaimer, the term of this patent is extended or adjusted under 35 U.S.C. 154(b) by 9 days.

(21) Appl. No.: 17/376,119

(22) Filed: Jul. 14, 2021

(65) Prior Publication Data

US 2022/0033058 A1 Feb. 3, 2022

Related U.S. Application Data

(60) Provisional application No. 63/057,942, filed on Jul. 29, 2020.

(51) Int. Cl.
*B64C 3/26* (2006.01)
*B64C 3/34* (2006.01)
*B64C 3/18* (2006.01)
*B64F 5/10* (2017.01)
*B29C 70/30* (2006.01)

(52) U.S. Cl.
CPC ............... *B64C 3/26* (2013.01); *B29C 70/30* (2013.01); *B64C 3/182* (2013.01); *B64C 3/185* (2013.01); *B64C 3/187* (2013.01); *B64C 3/34* (2013.01); *B64F 5/10* (2017.01)

(58) Field of Classification Search
CPC ............... B64C 3/20; B64C 3/26; B64C 3/34
See application file for complete search history.

(56) References Cited

U.S. PATENT DOCUMENTS

| 4,606,961 A | 8/1986 | Munsen |
| 7,871,040 B2 | 1/2011 | Lee |
| 10,974,478 B2 | 4/2021 | Behzadpour |
| 2003/0222170 A1 | 12/2003 | Wojciechowski |

(Continued)

FOREIGN PATENT DOCUMENTS

| EP | 1288124 A1 * | 3/2003 | ............... B64C 3/20 |
| EP | 2657128 | 10/2013 | |

OTHER PUBLICATIONS

Ahamed et al. "Ply-interleaving technique for joining hybrid carbon/glass fibre composite materials," Composites Part A: Applied Science and Manufacturing, vol. 84, May 2016, pp. 134-146.

*Primary Examiner* — Timothy D Collins
*Assistant Examiner* — Eric Acosta

(57) ABSTRACT

A wing assembly include at least one fuel tank having a tank outboard end. In addition, the wing assembly includes a stout wing rib located proximate the tank outboard end and extending between a front spar and a rear spar. The wing assembly also includes at least one outboard wing rib located outboard of the stout wing rib and defining an outboard wing bay. The wing assembly also includes an upper skin panel and a lower skin panel each coupled to the front spar, the rear spar, the stout wing rib, and the outboard wing rib. A plurality of bead stiffeners are coupled to the upper skin panel and/or the lower skin panel and are spaced apart from each other within the outboard wing bay.

21 Claims, 17 Drawing Sheets

(56) References Cited

U.S. PATENT DOCUMENTS

| | | |
|---|---|---|
| 2011/0139932 A1 | 6/2011 | Matheson |
| 2012/0052247 A1* | 3/2012 | Pook .................. B29C 66/4722 |
| | | 156/60 |
| 2013/0099058 A1* | 4/2013 | Payne .................. B29C 70/086 |
| | | 156/263 |
| 2016/0052214 A1 | 2/2016 | Behzadpour |
| 2019/0016436 A1 | 1/2019 | Behzadpour |
| 2019/0047676 A1 | 2/2019 | Behzadpour |
| 2020/0086970 A1 | 3/2020 | Behzadpour |
| 2020/0282692 A1 | 9/2020 | Behzadpour |

* cited by examiner

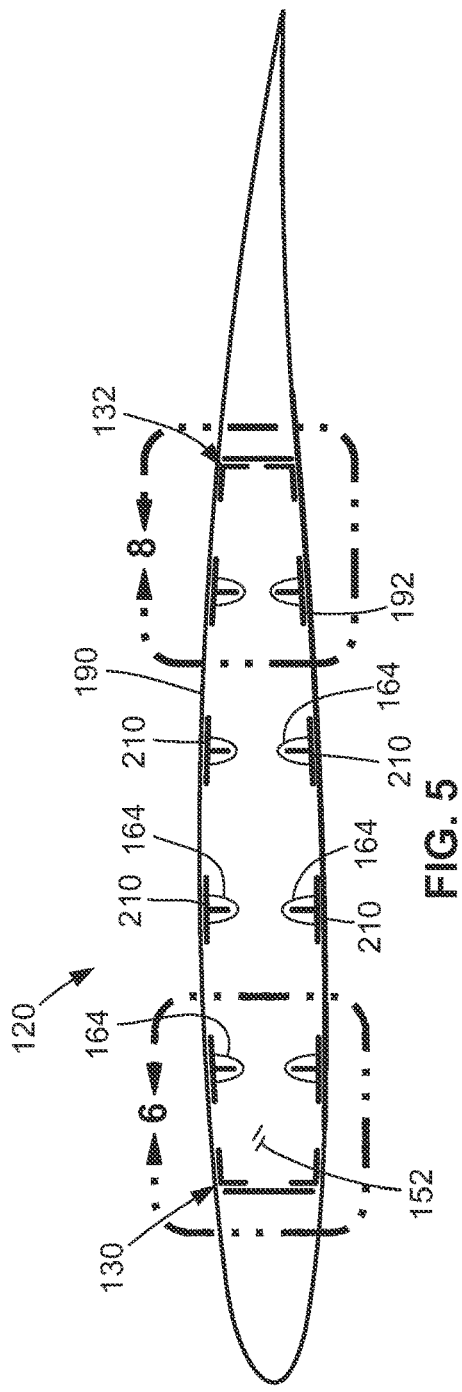
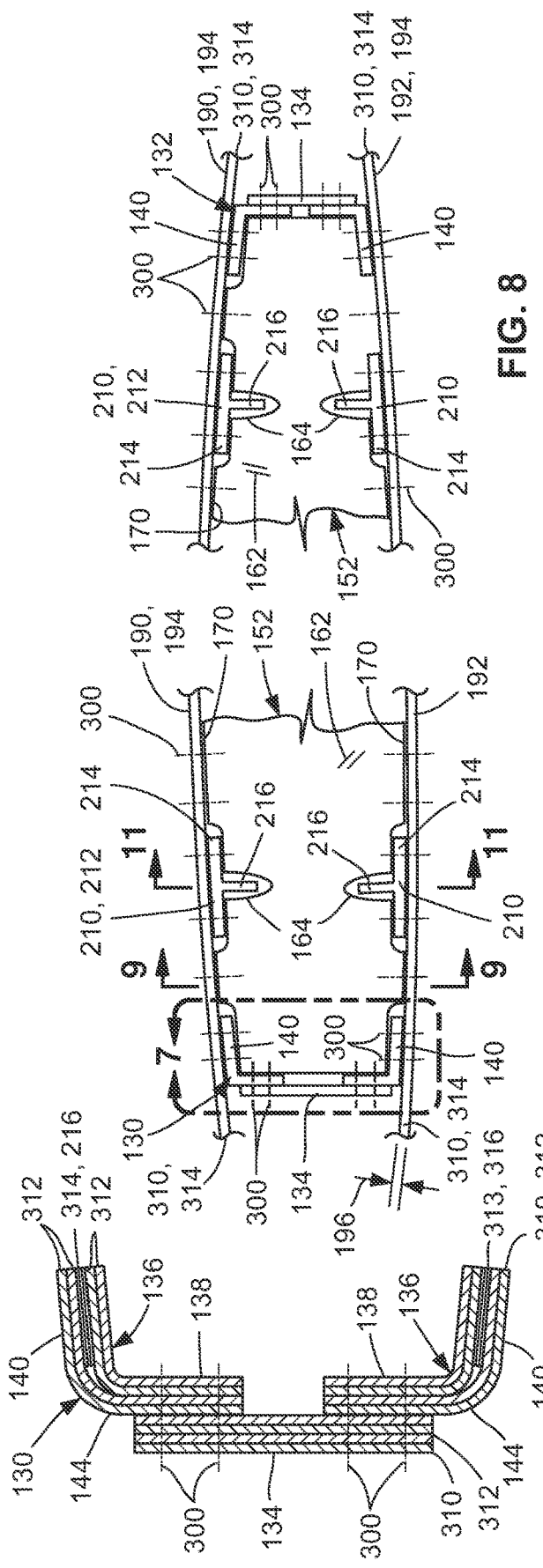

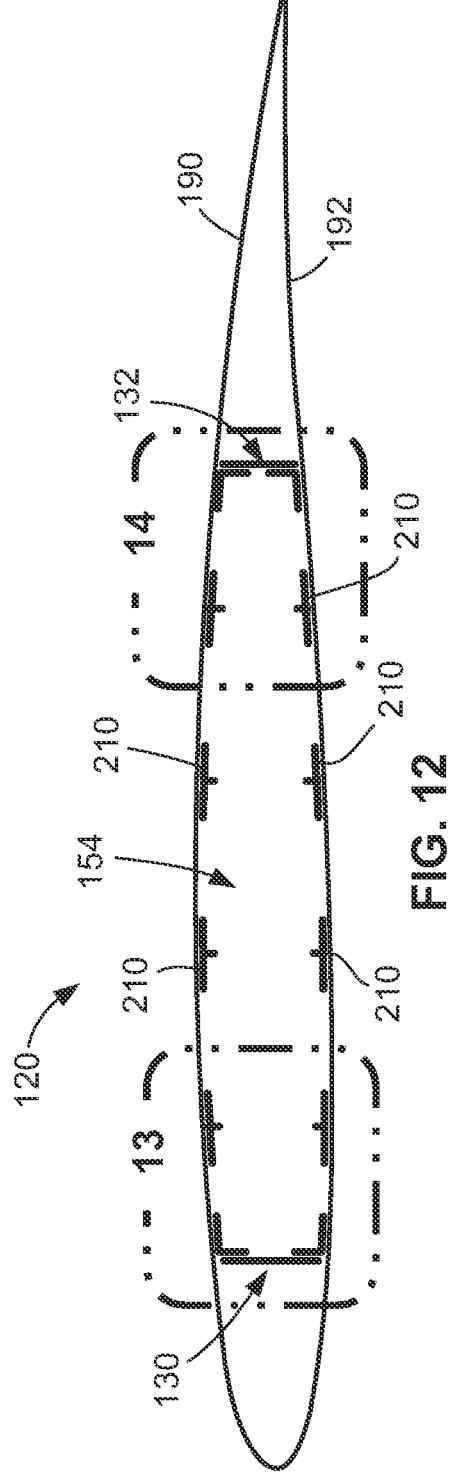
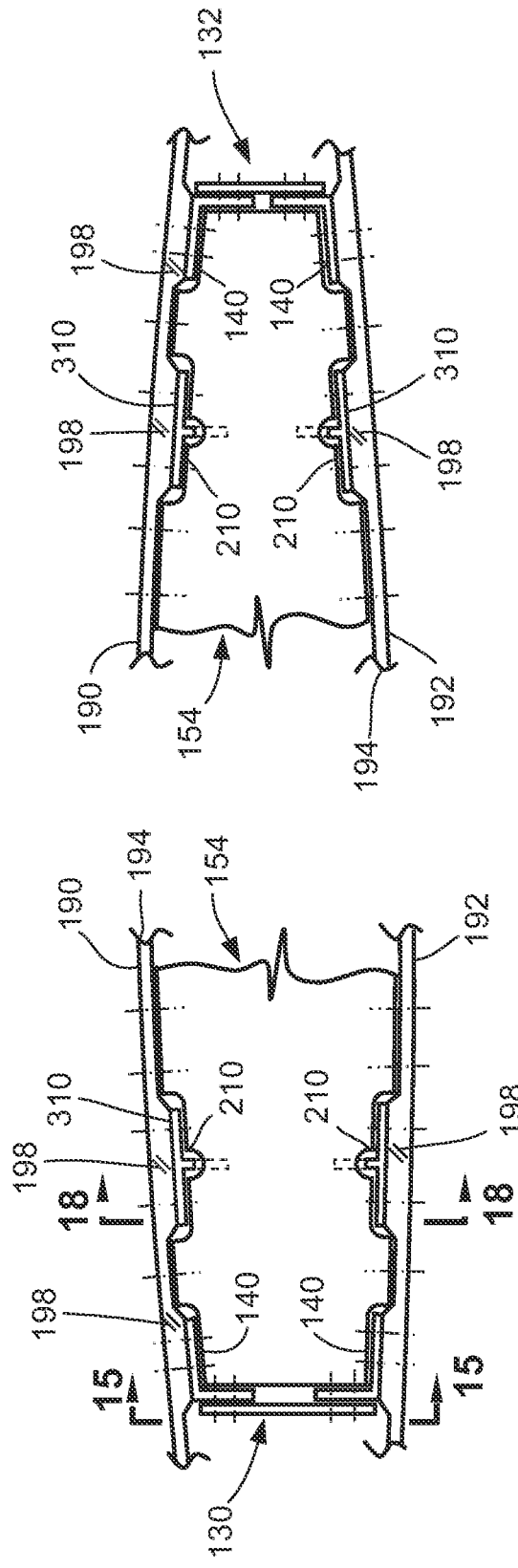
FIG. 12
FIG. 13
FIG. 14

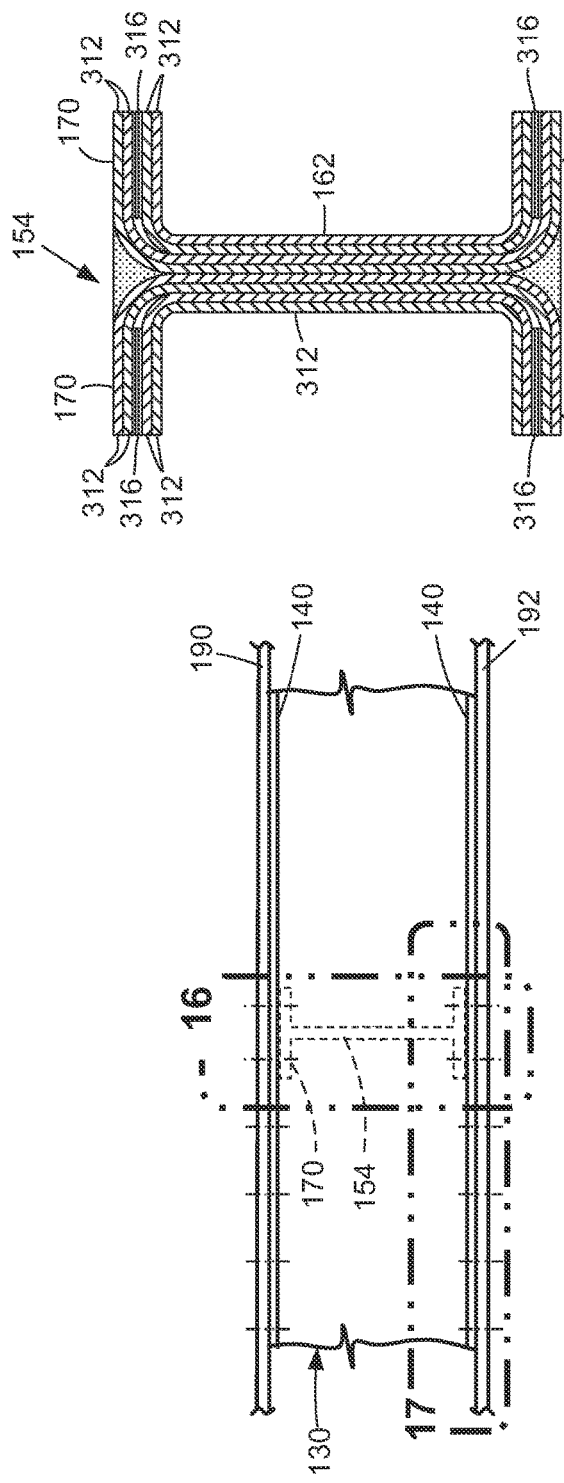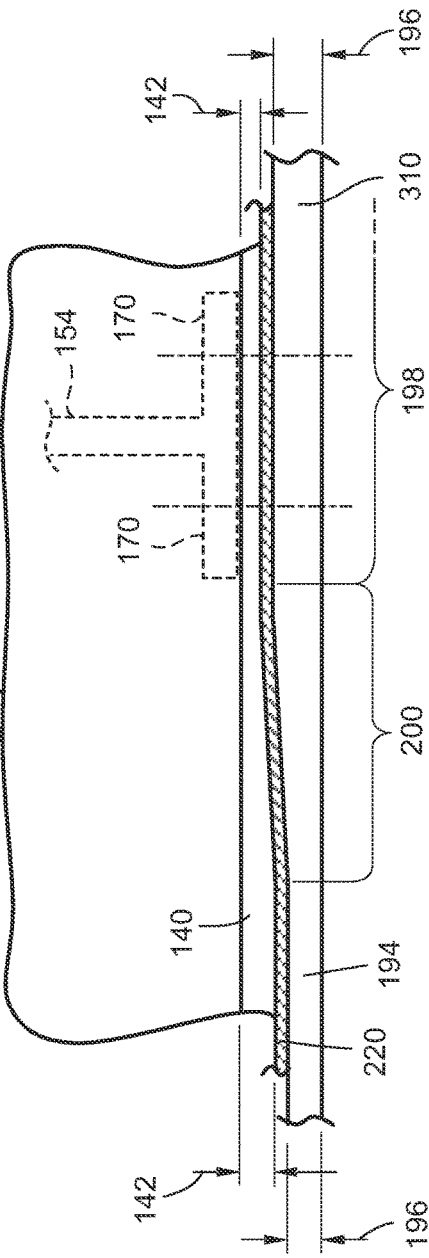

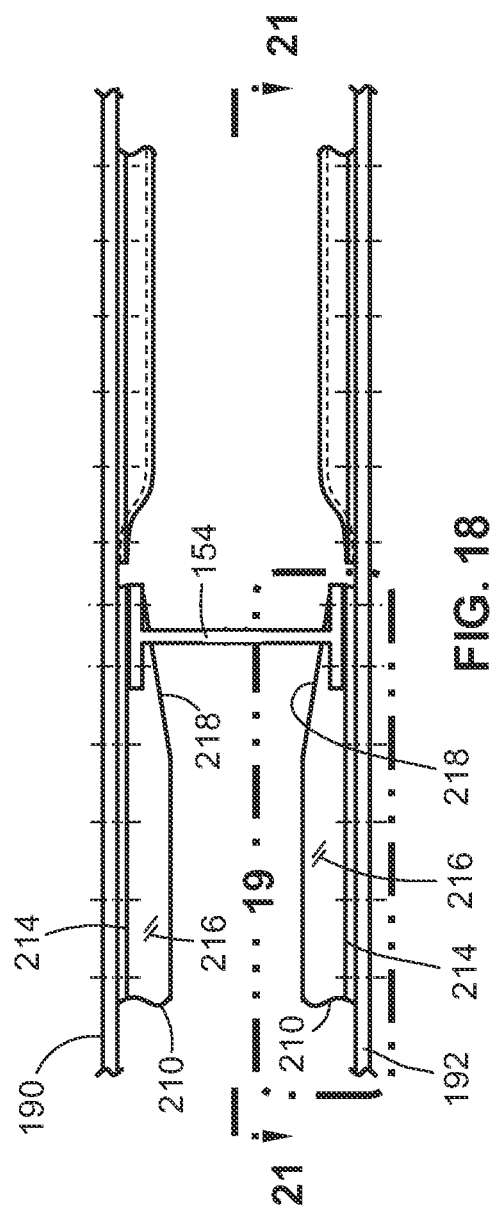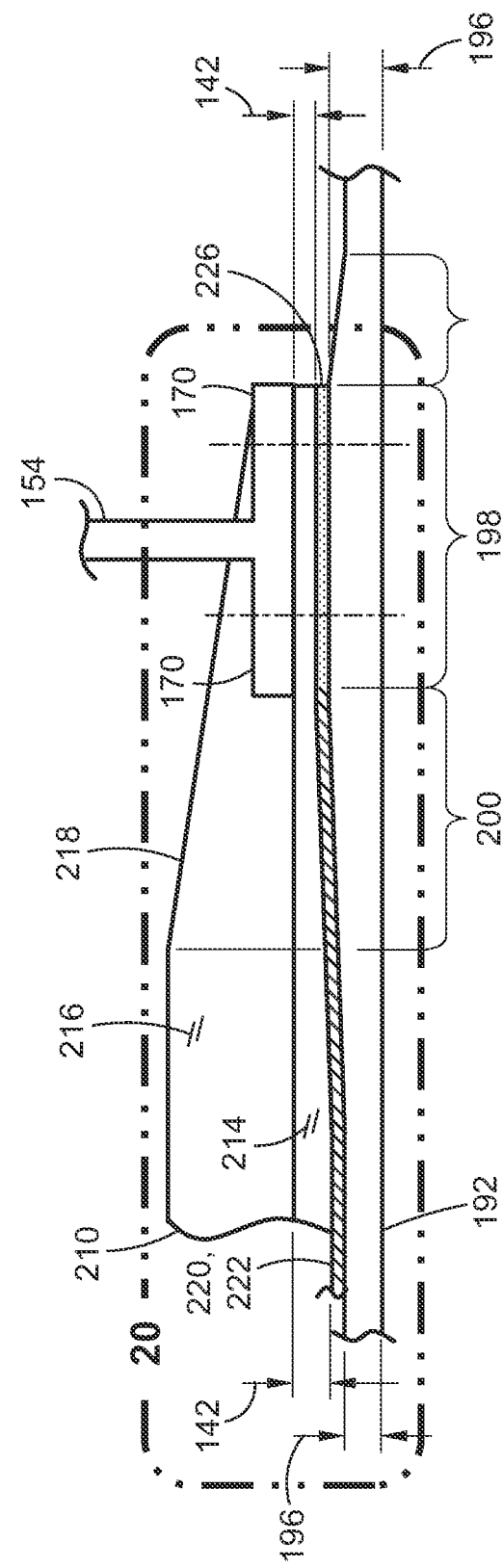

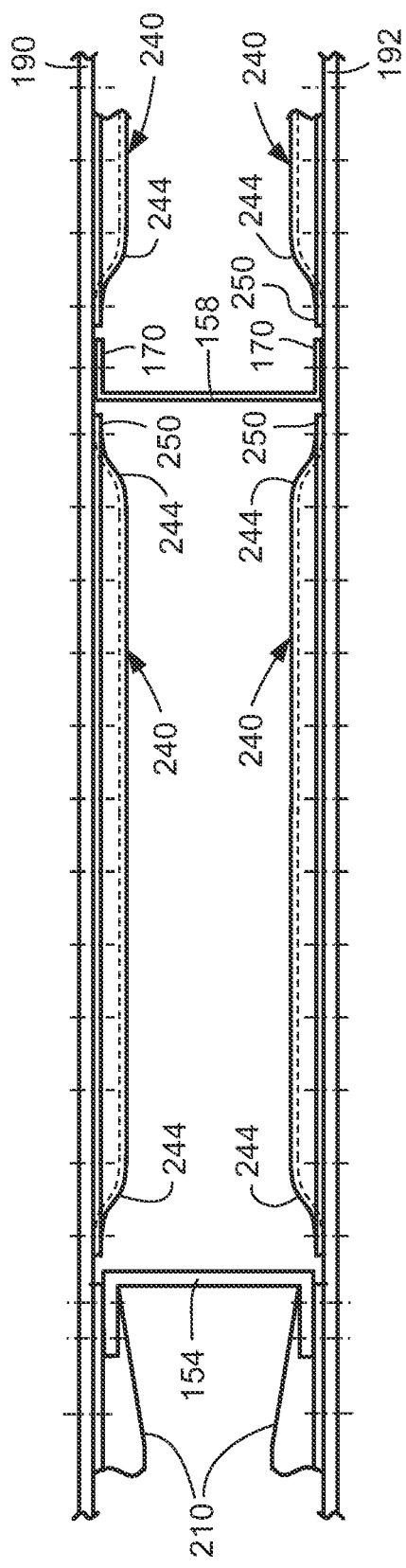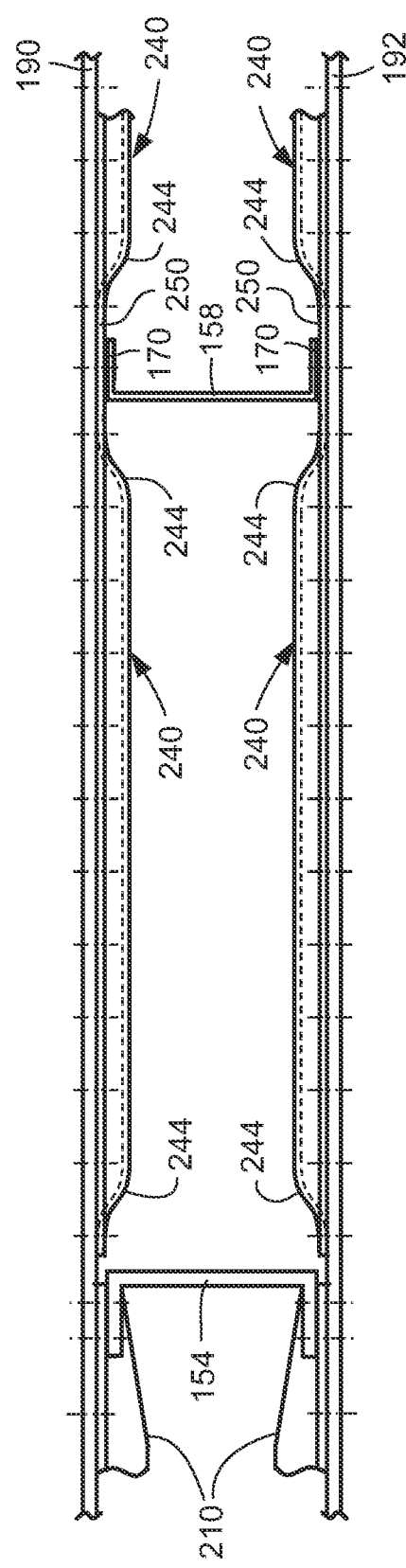

WING ASSEMBLY HAVING DISCRETELY STIFFENED COMPOSITE WING PANELS

CROSS-REFERENCE TO RELATED APPLICATIONS

The application claims priority to U.S. Provisional Application Ser. No. 63/057,942, filed Jul. 29, 2020, which is incorporated herein by reference in its entirety.

FIELD

The present disclosure relates generally to structural arrangements of aircraft wings and, more particularly, to a composite wing assembly having skin panels that are stiffened with discrete bead stiffeners.

BACKGROUND

The wing assembly of an aircraft typically includes an internal framework of spars and wing ribs covered by external skin panels. For example, an aircraft wing may include a front spar and a rear spar each extending in a spanwise direction. Each of the wing ribs extends between the front spar and the rear spar in a generally forward-aft direction. The skin panels are coupled to the spars and the wing ribs.

In conventional wing assemblies, stringers are coupled to the skin panels to increase the bending stiffness of the skin panels. Stringers typically extend continuously in a spanwise direction across multiple wing ribs. Each wing rib requires rib cutouts or mouse holes to allow the stringers to pass through the wing ribs. In a composite wing, the requirement for mouse holes complicates manufacturing and assembly of the wings. For example, the pull-off strength between composite stringers and the skin panel is relatively low, and which prevents the direct attachment of the wing rib to the stringers, and necessitates the installation of a shear-tie bracket at the location of each rib cutout as a means for transferring load between the wing rib and the skin panel. The installation of multiple shear-tie brackets increases manufacturing costs and assembly time and adds to the structural mass of the wings.

Conventionally, composite stringers are typically configured similar to their aluminum counterparts, and which results in difficulties in stringer manufacturing and wing assembly. For example, the cross-sectional shape of a conventional stringer has a relatively large stringer height. In high performance aircraft with relatively thin wings, large stringer heights present challenges in incorporating the conventional stringers into the confined spaces of the outer wing bays. In addition, the structural efficiency of conventional stringers is reduced in the outer wing bays, and may result in higher dynamic loads as a result of the relatively large mass and relatively high stiffness of conventional stringers.

Conventional composite skin panels may also be configured similar to their aluminum counterparts, and which may also present manufacturing and assembly challenges. For example, conventional composite skin panels may include locally thickened regions that cause warpage of the skin panels due to residual thermal stresses during curing. During the process of assembling a wing, excessive warpage of the skin panels may necessitate the time-consuming installation of shims to fill gaps between the skin panels and mating parts. The installation of shims may also increase the structural mass of the wings.

As can be seen, there exists a need in the art for a composite wing assembly that avoids the above-mentioned challenges associated with manufacturing, assembly, maintenance, and added structural mass of conventional composite wing assemblies.

SUMMARY

The above-noted needs associated with wing assemblies are specifically addressed by the present disclosure which provides a wing assembly configured to include at least one fuel tank having a tank outboard end. The wing assembly includes a front spar and a rear spar each extending along a spanwise direction from a wing root toward a wing tip of the wing assembly. In addition, the wing assembly includes a stout wing rib extending between the front spar and the rear spar and located proximate the tank outboard end. Furthermore, the wing assembly includes at least one outboard wing rib extending between the front spar and the rear spar and located outboard of the stout wing rib. The stout wing rib and the outboard wing rib define an outboard wing bay. The wings assembly also includes an upper skin panel and a lower skin panel each coupled to the front spar, the rear spar, the stout wing rib, and the outboard wing rib. In addition, the wing assembly includes a plurality of bead stiffeners coupled to at least one of the upper skin panel and the lower skin panel. The bead stiffeners are spaced apart from each other at a chordwise spacing within the outboard wing bay. Each bead stiffener extends along a spanwise direction and has a bead stiffener cap having opposing cap ends respectively located proximate the stout wing rib and the outboard wing rib.

Also disclosed is a method of manufacturing a wing assembly. The method includes positioning a stout wing rib between a front spar and a rear spar of a wing assembly configured to include at least one fuel tank having a tank outboard end. The front spar and the rear spar each extend along a spanwise direction from a wing root toward a wing tip of the wing assembly. The stout wing rib is positioned proximate a location of the tank outboard end. The method further includes positioning at least one outboard wing rib between the front spar and the rear spar and outboard of the stout wing rib. The stout wing rib and the outboard wing rib define an outboard wing bay. The stout wing rib has a strength capability that is higher than the outboard wing rib. The method further includes coupling a plurality of bead stiffeners to at least one of an upper skin panel and a lower skin panel in a manner such that the bead stiffeners are spaced apart from each other at a chordwise spacing within the outboard wing bay, and are each oriented along a spanwise direction and each have a bead stiffener cap having opposing cap ends that are respectively located proximate the stout wing rib and the outboard wing rib. In addition, the method includes coupling the upper skin panel and the lower skin panel to the front spar, the rear spar, the stout wing rib, and the outboard wing rib.

Also disclosed is a method of loading a wing assembly. The method includes providing a wing assembly configured to include at least one fuel tank having a tank outboard end. The wing assembly includes a front spar and a rear spar each extending along a spanwise direction from a wing root toward a wing tip of the wing assembly. In addition, the wing assembly includes a stout wing rib extending between the front spar and the rear spar and located proximate the tank outboard end. Furthermore, the wing assembly includes at least one outboard wing rib extending between the front spar and the rear spar and located outboard of the stout wing rib. The stout wing rib and the outboard wing rib define an outboard wing bay. The wing assembly additionally includes an upper skin panel and a lower skin panel each coupled to the front spar, the rear spar, the stout wing rib, and the outboard wing rib. Furthermore, the wing assembly includes a plurality of bead stiffeners coupled to at least one of the upper skin panel and the lower skin panel. The bead stiffeners are spaced apart from each other at a chordwise spacing within the outboard wing bay. Each bead stiffener extends along a spanwise direction and has a bead stiffener cap having opposing cap ends respectively located proximate the stout wing rib and the outboard wing rib. The method also includes placing the wing assembly in a ground static loading condition. In addition, the method includes placing the wing assembly in a dynamic loading condition.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a sectional view of the wing assembly taken along line 5-5 of FIG. 3 and illustrating rib cutouts formed in an inboard wing rib for passage of the stringers through the inboard wing rib;

FIG. 6 is a magnified view of a portion of the wing assembly identified by reference numeral 6 of FIG. 5 and illustrating stringers passing through mouse holes formed in the inboard wing rib, and further illustrating the wing rib, the upper skin panel, and the lower skin panel fastened to the front spar;

FIG. 7 is a magnified sectional view of an example of a front spar of FIG. 6 comprised of composite plies and having an upper spar chord and a lower spar chord interconnected by a spar web;

FIG. 8 is a magnified view of a portion of the wing assembly identified by reference numeral 8 of FIG. 5 and illustrating the inboard wing rib, the upper skin panel, and the lower skin panel fastened to the rear spar;

FIG. 12 is a sectional view of the wing assembly taken along line 12-12 of FIG. 3 and illustrating the stringers terminating at the stout wing rib;

FIG. 13 is a magnified view of a portion of the wing assembly identified by reference numeral 13 of FIG. 12 and illustrating the stout wing rib coupled to the front spar;

FIG. 14 is a magnified view identified by reference numeral 14 of FIG. 12 and illustrating the stout wing rib coupled to the rear spar;

FIG. 15 is a sectional view of the wing assembly taken along line 15-15 of FIG. 13 and illustrating an example of the stout wing rib having an I-shaped cross-section;

FIG. 16 is a magnified sectional view of the stout wing rib of FIG. 15 in which the rib web and rib outer flanges are comprised of fabric plies, and the spar outer flanges contain one or more 0-degree plies interleaved within the fabric plies;

FIG. 17 is a magnified view of a portion of the wing assembly identified by reference numeral 17 of FIG. 15 and illustrating a padup region of increased thickness of the lower skin panel, and further illustrating a corresponding decrease in the flange thickness of the spar outer flanges at the location of the stout wing rib;

FIG. 18 is a magnified sectional view of the wing assembly taken along line 18-18 of FIG. 13 and illustrating the stringer runouts (i.e., terminations) at the stout wing rib, and also illustrating bead stiffeners coupled to the upper and lower skin panels on an outboard side of the stout wing rib;

FIG. 19 is a magnified view of the portion of the wing assembly identified by reference numeral 19 of FIG. 18 and illustrating an adhesive layer bonding the stringer flanges of a stringer to the lower skin panel, and further illustrating a flange-skin gap between the stringer flanges and the skin panel at the location of the padup region directly underneath the stringer flanges;

FIG. 28 is a sectional view of an example of an outboard wing portion in which an entirety of each bead stiffener is located within each outboard wing bay;

FIG. 29 is a sectional view of an example of an outboard wing portion in which the bead stiffener flanges extend across one or more of the outboard wing bays;

DETAILED DESCRIPTION

Figure 1:
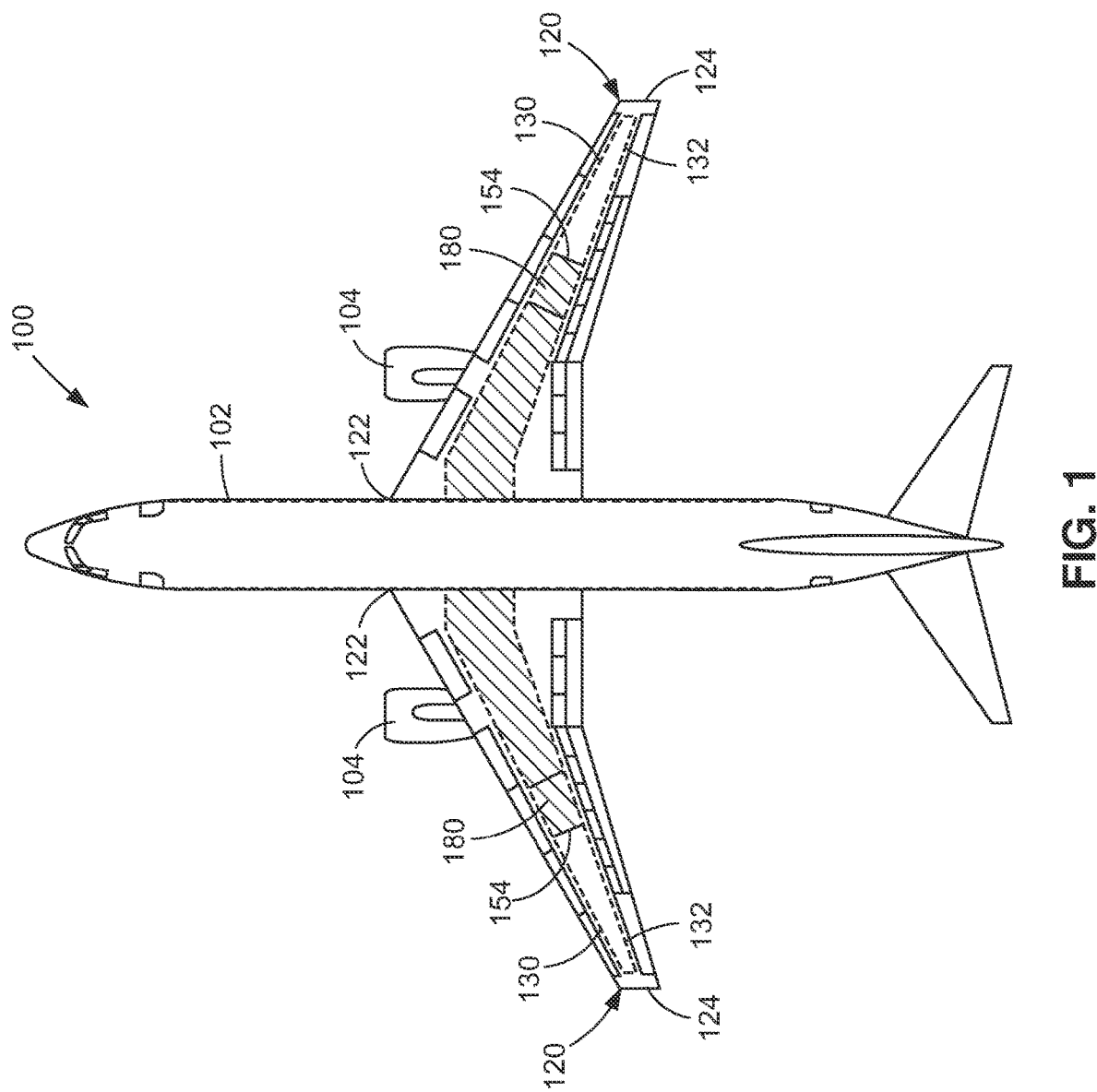
FIG. 1 is a top view of an example of an aircraft.

Referring now to the drawings which illustrate various examples of the disclosure, shown in FIG. 1 is a top view of an example of an aircraft 100. The aircraft 100 includes a fuselage 102, a pair of composite wing assemblies 120 extending outwardly from the fuselage 102, and a pair of engines 104 respectively mounted to the wing assemblies 120. Each composite wing assembly 120 includes a front spar 130 and a rear spar 132 formed of composite material and extending along a spanwise direction from a wing root 122 toward a wing tip 124. In addition, each wing assembly 120 includes a plurality of wing ribs 152, 158 (FIGS. 2-4) which may be formed of composite material and which may extend between the front spar 130 and the rear spar 132. Furthermore, each wing assembly 120 includes an upper skin panel 190 and a lower skin panel 192 (FIG. 4) each formed of composite material and coupled to the front spar 130, the rear spar 132, and the wing ribs 152, 158. Each wing assembly 120 is configured to include at least one fuel tank 180 for supplying fuel to the engines 104.

Figure 2:
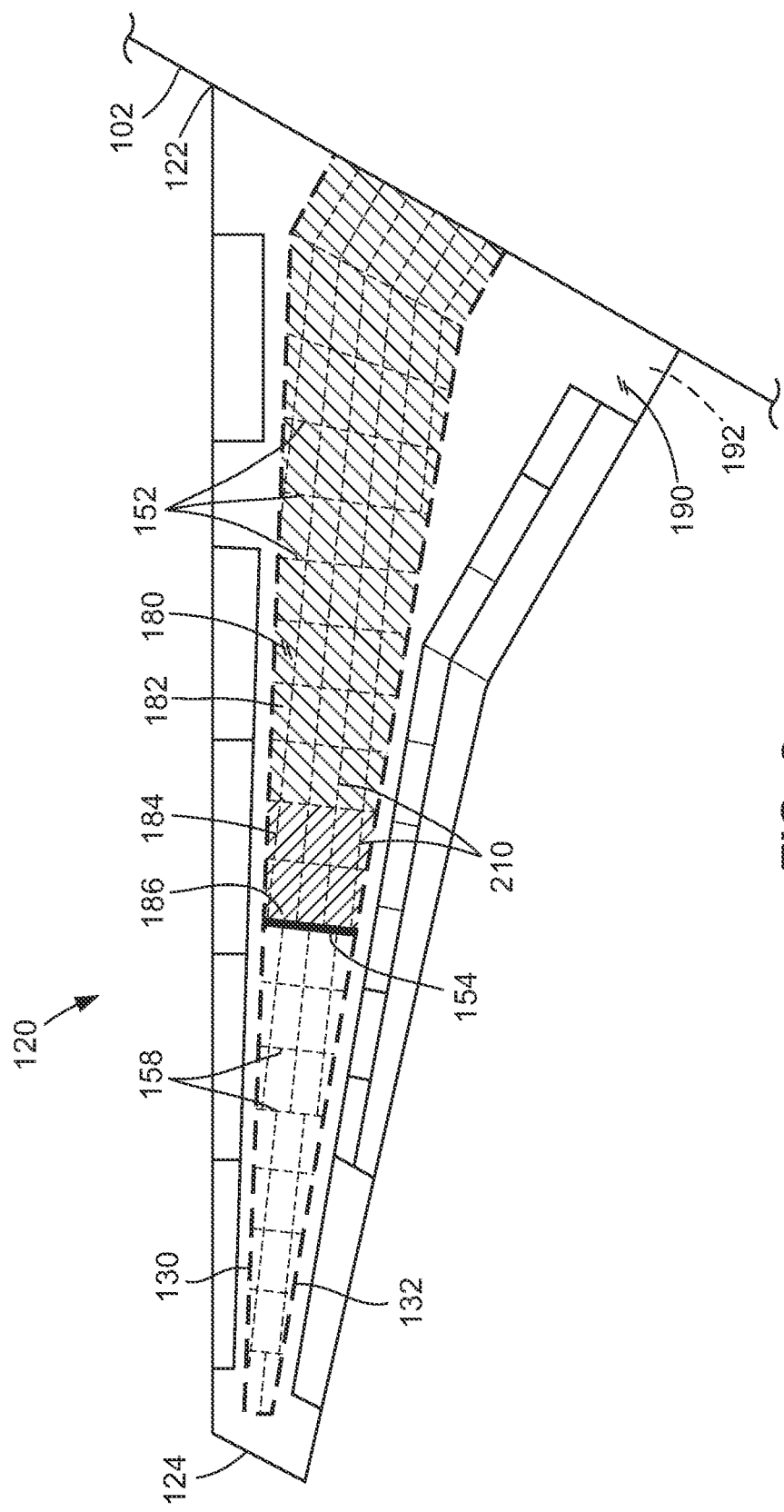
FIG. 2 is a top view of an example of a wing assembly having one or more fuel tanks and a stout wing rib located at the tank outboard end.

Referring to FIGS. 1-2, the internal structure (e.g., the spars 130, 132, the wing ribs 152, 158, and the skin panels 190, 192) of each wing assembly 120 may define the walls of the one or more fuel tanks 180. Alternatively, each fuel tank 180 may be a self-contained structure (not shown) that is installed within the wing assembly 120. Each wing assembly 120 may contain multiple fuel tanks 180. For example, the wing assembly 120 of FIGS. 1-2 includes a main tank 182 and a vent tank 184 located outboard of the main tank 182. In the present disclosure, the outermost fuel tank 180 in each wing assembly 120 has a tank outboard end 186. In addition, each wing assembly 120 includes a stout wing rib 154 located proximate the tank outboard end 186 of the vent tank 184. For example, the stout wing rib 154 may be no further from the tank outboard end 186 than 10 percent of the spanwise distance between the wing root 122 and the wing tip 124. In other examples, the stout wing rib 154 may define the tank outboard end 186.

Figure 3:
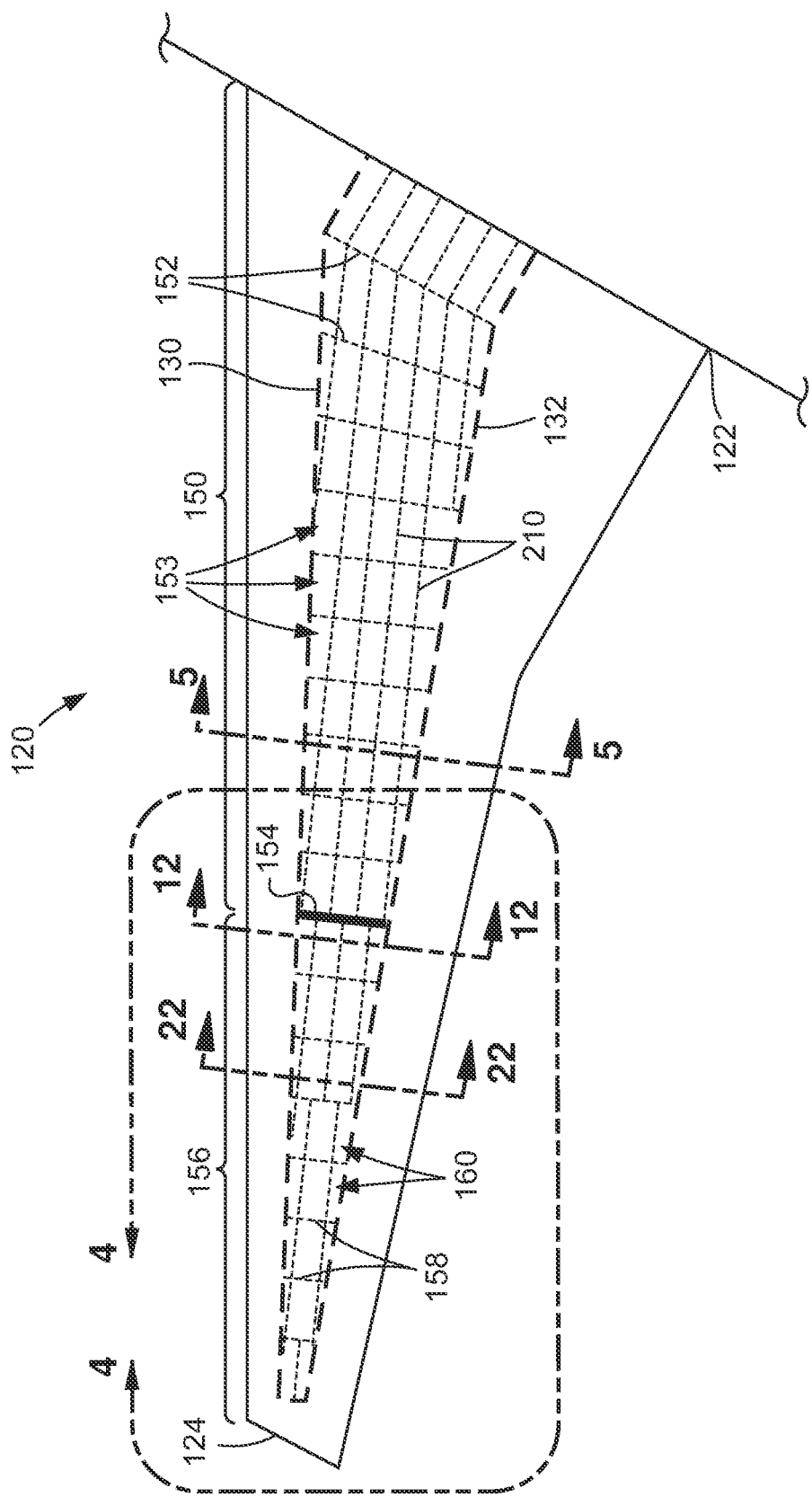
FIG. 3 is a top view of the wing assembly of FIG. 2 and illustrating a front spar, a rear spar, and a plurality of bead stiffeners coupled to an upper skin panel and a lower skin panel at locations outboard of the stout wing rib.
Figure 4:
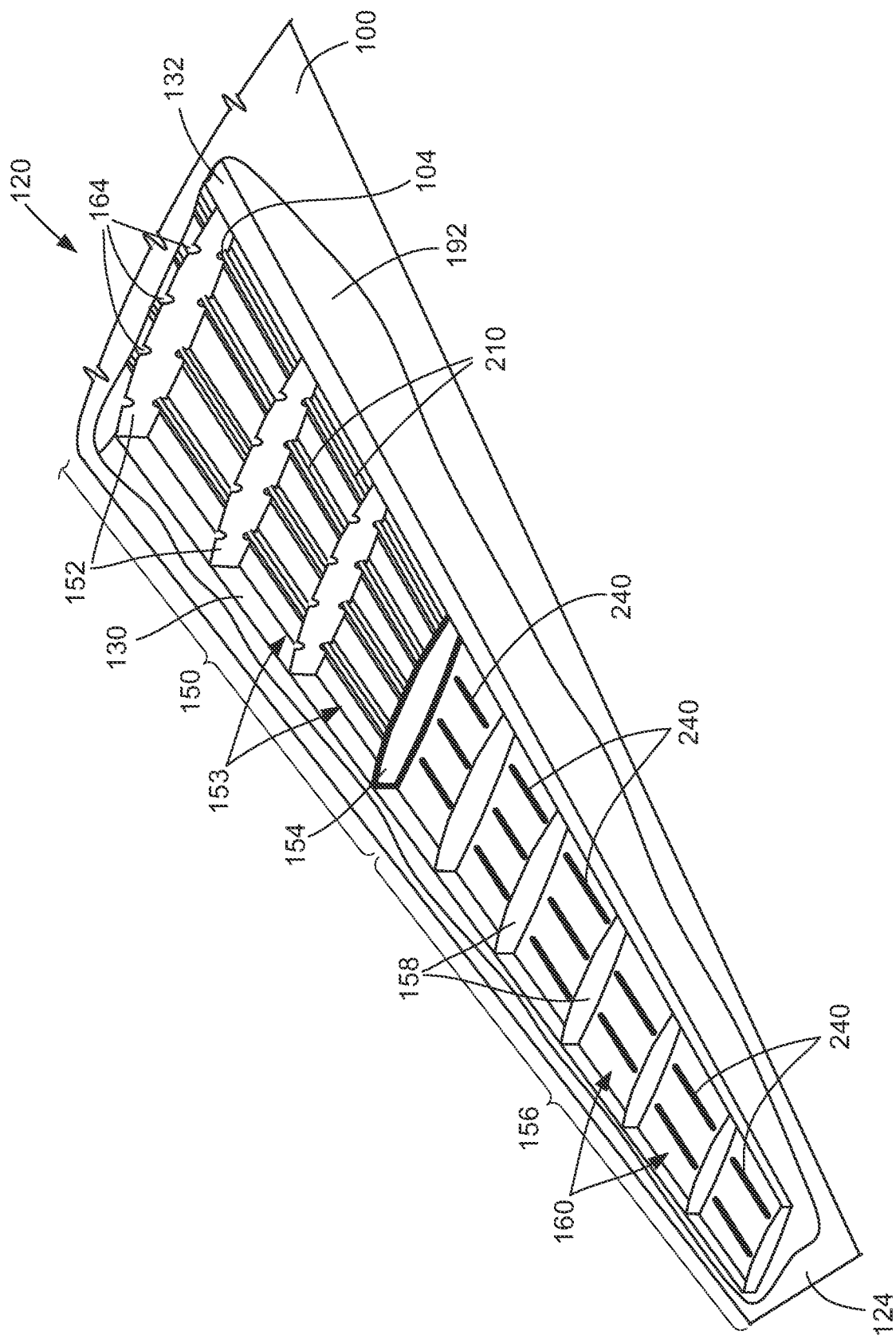
FIG. 4 is a partially cutaway perspective view of an example of a wing assembly having discrete bead stiffeners coupled to the lower skin panel at locations outboard of the stout wing rib, and stringers coupled to the lower skin panel at locations inboard of the stout wing rib.

Referring to FIGS. 2-4 and 16, the stout wing rib 154 extends between the front spar 130 and the rear spar 132. As described in greater detail below, the stout wing rib 154 may have a strength capability that is higher than the strength capability of any one of the outboard wing ribs 158 and/or inboard wing ribs 152. For example, the rib outer flanges 170 (FIG. 16) of the stout wing rib 154 may have a greater flange thickness 142 and/or the rib web 162 (FIG. 16) may have a greater web thickness than the remaining wing ribs 152, 158 (FIG. 10) of the wing assembly 120. In the present disclosure, the stout wing rib 154 may define an imaginary line dividing between an inboard wing portion 150 and an outboard wing portion 156 of the wing assembly 120. The wing ribs of the inboard wing portion 150 are described as inboard wing ribs 152. As shown in FIG. 4, the inboard wing ribs 152 are located at spaced intervals between the wing root 122 and the stout wing rib 154. Adjacent pairs of inboard wing ribs 152 define inboard wing bays 153. The wing ribs of the outboard wing portion 156 are described as outboard wing ribs 158, and may be located at spaced intervals between the stout wing rib 154 and the wing tip 124. Adjacent pairs of outboard wing ribs 158 define outboard wing bays 160.

Referring to FIGS. 2-6, the inboard wing portion 150 may include a plurality of stringers 210 coupled to the upper skin panel 190 and the lower skin panel 192. The stringers 210 each extend in a spanwise direction and are spaced apart from each other at a chordwise spacing 256 between the front spar 130 and the rear spar 132. As mentioned above, the stringers 210 provide the inboard wing portion 150 with a relatively high degree of bending stiffness compared to a reduced amount of bending stiffness of the outboard wing portion 156. As shown in FIGS. 2-4, at least some of the stringers 210 extend continuously from the wing root 122 to the stout wing rib 154, passing through rib cutouts 164 (FIGS. 4-6) in the inboard wing bays 153. Notably, the wing assembly 120 is devoid of stringers 210 outboard of the stout wing rib 154.

In FIGS. 5-6, each of the stringers 210 has one or more stringer flanges 214 and at least one stringer web 216 extending outwardly from the one or more stringer flanges 214. Each of the stringers 210 may be coupled to the upper skin panel 190 or lower skin panel 192 via the stringer flanges 214. For example, the stringer flanges 214 of a stringer 210 may be bonded (e.g., co-bonded, secondary bond) and/or mechanically fastened to the upper skin panel 190 and/or the lower skin panel 192.

Referring still to FIGS. 5-6, the stringers 210 are each configured as a blade stringer 212 having a single stringer web 216. However, the stringers 210 may be provided in alternative configurations, such as a hat-section stringer (not shown) having a pair of stringer webs extending outwardly respectively from a pair of stringer flanges, and the stringer webs may be interconnected by a stringer cap (not shown). The inboard wing ribs 152 include a plurality of rib cutouts 164 in the rib outer flanges 170 and/or in the rib webs 162 at discrete locations along the upper edge and/or lower edge of the inboard wing ribs 152. The rib cutouts 164 provide clearance for the stringers 210 to pass through the inboard wing ribs 152.

Referring to FIGS. 6-8, the inboard wing ribs 152 may be coupled to the upper skin panel 190 and/or lower skin panel 192 via a combination of bonding and mechanical fasteners 300. In addition, the inboard wing ribs 152 may be coupled to the front spar 130 and the rear spar 132 via mechanical fasteners 300. The front spar 130 and the rear spar 132 may each have a channel-shaped cross section having a spar web 134 and an opposing pair of spar outer flanges 140 interconnected by the spar web 134. Each of the spar outer flanges 140 may be connected to the spar web 134 by a radius portion 144.

As mentioned above, the front spar 130 and the rear spar 132 may be formed of composite plies 310 as may the wing ribs and the skin panels 190, 192. Advantageously, structures formed of composite material have improved corrosion resistance and improved fatigue strength relative to the corrosion resistance and fatigue strength of metallic materials (e.g., aluminum) used in conventional wing assemblies. The composite plies 310 may be comprised of fiber-reinforced polymer matrix material (e.g., prepreg) and may be provided in thicknesses of 0.005 inch or more. The polymer matrix material may be a thermosetting resin or a thermoplastic resin. The fibers may be carbon fibers or the fibers may be formed of alternative materials such as glass, boron, aramid, ceramic or other non-metallic materials or metallic materials.

The spar web 134 and the spar outer flanges 140 of the front spar 130 and the rear spar 132 may be comprised of fabric plies 312. In the present disclosure, a fabric ply 312 may be defined as having multi-directional fibers. For example, a fabric ply 312 may include a woven arrangement of bi-directional fibers oriented perpendicular to each other. In contrast, a unidirectional ply 314 may consist of an arrangement of parallel fibers. Advantageously, fabricating the front spar 130 and rear spar 132 from fabric plies 312 may reduce or avoid warpage (e.g., spring-in) and/or wrinkles that may otherwise occur if the front spar 130 and the rear spar 132 were formed of unidirectional plies 314.

The upper skin panel 190 and the lower skin panel 192 are each comprised of acreage plies 194 which may be described as composite plies 310 that extend continuously from the wing root 122 (FIG. 3) toward the wing tip 124 (FIG. 3), and from the front spar 130 to the rear spar 132. The acreage plies 194 exclude composite plies 310 in the localized padup regions 198. The composite plies 310 of the skin panels 190, 192 may be exclusively unidirectional plies 314 (i.e., no fabric plies), and may include +45-degree plies, −45-degree plies, 90-degree plies, 0-degree plies, and/or composite plies having one or more other unidirectional fiber orientations. The panel thickness 196 of the acreage plies 194 may be substantially constant (e.g., within 20 percent of each other at any spanwise location) which may simplify manufacturing of the upper skin panel 190 and lower skin panel 192 by eliminating the need to incorporate ply drops in the acreage plies 194 as a means for gradually reducing the bending stiffness of the wing assembly 120 along the outboard direction.

Advantageously, the skin panels 190, 192 may be provided in a relatively thin gauge (i.e., panel thickness 196) which may improve the fatigue loading performance (i.e., durability) of the skin panels 190, 192 relative to the fatigue loading performance of aluminum skin panels of conventional wing assemblies. Furthermore, the relatively thin gauge of the upper skin panel 190 and lower skin panel 192 may minimize or avoid the potential for interlaminar failure modes between the composite plies 310. The panel thickness 196 of the upper skin panel 190 and lower skin panel 192 may be selected to provide the desired level of stiffness and stability, while being resistant to aerodynamic flutter. The minimum panel thickness 196 may be dictated by flammability requirements of the Federal Aviation Administration (FAA). For example, the upper skin panel 190 and lower skin panel 192 may each have a minimum of 32 composite plies 310, resulting in a panel thickness providing a level of structural integrity in compliance with FAA flammability requirements.

Referring still to FIGS. 6-8, the spar outer flanges 140 of the front spar 130 and/or the rear spar 132 may include one or more 0-degree plies 316 to increase the shear strength of the spar outer flanges 140. A 0-degree ply 316 may be defined as a unidirectional ply 314 in which all of the fibers are generally parallel to each other, and the fibers of the 0-degree plies 316 are oriented along a lengthwise direction of the spar outer flanges 140. The one or more 0-degree plies 316 may be located at the approximate mid-plane of the spar outer flange 140. The 0-degree plies 316 in the spar outer flanges 140 may be excluded from the radius portion 144 and from the spar web 134. During layup, the side edges of the 0-degree plies 316 may be maintained at distance of no less than 0.25 inch from the radius portion 144 to avoid warpage of the spar flanges 138, 140 during curing.

The front spar 130 and/or the rear spar 132 may each be provided in a multi-piece configuration as a means to simplify the manufacturing of the wing assembly 120. For example, as shown in FIG. 7, the front spar 130 and/or the rear spar 132 may each include a pair of spar chords 136 (e.g., an upper spar chord and a lower spar chord). Each of the spar chords 136 may include a spar inner flange 138 and a spar outer flange 140 interconnected by a radius portion 144. The spar inner flange 138 of each spar chord 136 may be coupled to the spar web 134 via mechanical fastening, such as via a double row of mechanical fasteners 300 extended through the spar inner flange 138 and the spar web 134. The spar outer flange 140 of each spar chord 136 may be coupled to a skin panel (e.g., the upper skin panel 190 or the lower skin panel 192). For example, the spar outer flanges 140 may be bonded (e.g., co-bonded) to one of the skin panels 190, 192, and may additionally be mechanically fastened via a double row of mechanical fasteners 300 that may be extended through the spar outer flange 140 and the skin panel 190, 192. As mentioned above, each of the spar chords 136 is comprised of fabric plies 312. The spar outer flanges 140 of each of the spar chords 136 may include one or more 0-degree plies 316 for increasing the shear strength of the spar outer flanges 140, as mentioned above. Although the figures illustrate a multi-piece configuration for the front spar 130 and the rear spar 132, the front spar 130 and/or the rear spar 132 may be provided in a single-piece configuration (not shown) consisting of a pair of spar outer flanges 140 interconnected (via radius portions 144) by a spar web 134.

Figure 11:
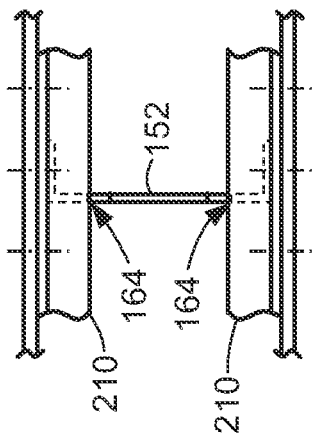
FIG. 11 is a sectional view of the wing assembly taken along line 11-11 of FIG. 6 and illustrating the stringers passing through rib cutouts formed in the wing rib.
Figure 10:
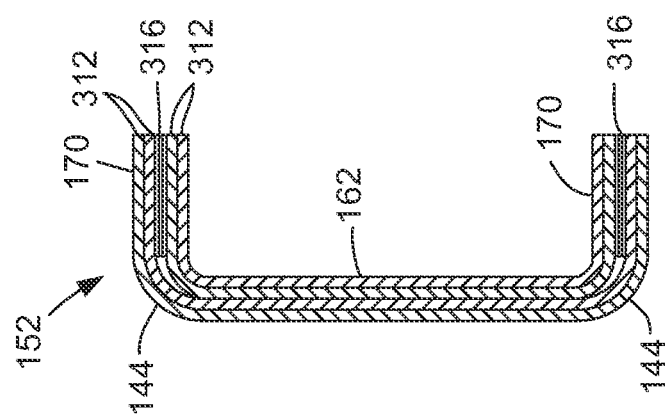
FIG. 10 is a magnified sectional view of a hybrid configuration of the wing rib of FIG. 9 in which the rib web and rib outer flanges are comprised of fabric plies, and the rib outer flange contains one or more 0-degree plies interleaved within the fabric plies.
Figure 9:
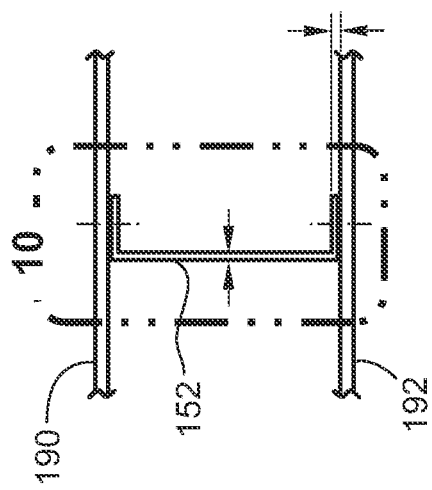
FIG. 9 is a sectional view taken along line 9-9 of FIG. 6 and illustrating an example of an inboard wing rib having upper and lower rib outer flanges interconnected by a rib web.

Referring to FIGS. 9-11, shown in FIG. 9 is an example of an inboard wing rib 152 coupled to the upper skin panel 190 and the lower skin panel 192. FIG. 10 shows an example of a channel-shaped cross-section of the inboard wing rib 152 (or outboard wing rib 158—FIG. 4). FIG. 11 shows the stringers 210 on the upper skin panel 190 and the lower skin panel 192 passing through rib cutouts 164 in the inboard wing rib 152. As shown in FIGS. 9-11, the inboard wing rib 152 may include opposing rib outer flanges 170 interconnected by a rib web 162. Each of the rib outer flanges 170 may be connected to the rib web 162 by a radius portion 144. The outboard wing ribs 158 (FIG. 4) may be configured in a manner similar to the inboard wing ribs 152. Similar to the above-described configuration of the front spar 130 and/or the rear spar 132, the inboard wing ribs 152 (and outboard wing ribs 158) may be fabricated from fabric plies 312 to reduce or avoid warping and/or wrinkling during curing.

As shown in FIG. 10, the rib outer flanges 170 may each include one or more 0-degree plies 316 located at an approximate mid-plane of the rib outer flanges 170 for increasing the shear strength of the inboard wing ribs 152 (or outboard wing ribs 158). As mentioned above, the 0-degree plies 316 may be excluded from the radius portion 144 and from the rib web 162 to reduce or avoid warpage. Although shown in a single-piece configuration, the inboard wing ribs 152 (and the outboard wing ribs 158) may be provided in a multi-piece configuration (not shown) in which each of the rib outer flanges 170 is respectively part of a pair of rib chords 166 (e.g., an upper rib chord and a lower rib chord) interconnected by a rib web 162, similar to the above-described multi-piece configuration of the front spar 130 (or rear spar 132) shown in FIG. 7. Although not shown, the rib web 162 of the outboard wing ribs 158 and/or the inboard wing ribs 152 may each include discrete stiffeners to prevent out-of-plane buckling of the wing ribs 152, 158.

Referring to FIGS. 12-14, shown in FIG. 12 is a sectional view of the wing assembly 120 illustrating the stout wing rib 154 and the stringers 210 which terminate at the stout wing rib 154. As mentioned above, the stout wing rib 154 has increased strength capability relative to the remaining wing ribs 152, 158 (FIG. 4) in the wing assembly 120. The increased strength capability of the stout wing rib 154 may accommodate the termination of the stringers 210 in the inboard wing portion 150. In this regard, the stout wing rib 154 may provide a load path for bending stresses in the stringers 210. In addition, the stout wing rib 154 may accommodate differences in the bending stiffness of the inboard wing portion 150 (FIG. 4) relative to the bending stiffness of the outboard wing portion 156 (FIG. 4). For example, for an aircraft 100 (FIG. 1) having relatively thin, high-performance wings, the outboard wing portion 156 may be moderately loaded and may be structurally sized based on dynamic loads, which are a function of mass and stiffness. In this regard, the outboard wing portion 156 preferably has less bending stiffness to provide the outboard wing portion 156 with more flexibility for complying with aeroelasticity performance requirements. The increased flexibility of the outboard wing portion 156 allows for a lighter weight structure. In contrast, the inboard wing portion 150 is subjected to heavier loads and has higher stiffness requirements. The heavier loading and higher stiffness requirements of the inboard wing portion 150 may be dictated in part by the relatively heavy components that are attached to the inboard wing portion 150, such as the engines 104 (FIG. 1) and the landing gear (not shown).

FIGS. 13-14 show the stout wing rib 154 coupled to the upper skin panel 190, the lower skin panel 192, the front spar 130 (FIG. 13) and the rear spar 132 (FIG. 14) in a manner similar to the above-described arrangement shown in FIGS. 6-8. Also shown are localized padup regions 198 on the inner surface of the upper skin panel 190 and lower skin panel 192 at the stout wing rib 154 where the stringers 210 terminate. In addition, shown are localized padup regions 198 where the front spar 130 and the rear spar 132 intersect the stout wing rib 154. The localized padup regions 198 are comprised of composite plies 310 on top of the acreage plies 194 that make up the upper skin panel 190 and lower skin panel 192.

Referring to FIGS. 15-16, shown in FIG. 15 is an example of a portion of the front spar 130 at the spanwise location of the stout wing rib 154. FIG. 16 shows an example of the stout wing rib 154 having an I-shaped cross section. The stout wing rib 154 includes a rib web 162 interconnecting the rib outer flanges 170 on the upper side and lower side of the stout wing rib 154. The stout wing rib 154 may be comprised of fabric plies 312 to reduce or limit the occurrence of warpage and/or wrinkles that may otherwise occur if the stout wing rib 154 were manufactured with unidirectional plies 314. The spar outer flanges 140 of the stout wing rib 154 may contain one or more 0-degree plies 316 interleaved within the fabric plies 312 at an approximate mid-plane of the rib outer flanges 170 as a means for increasing the shear strength of the stout wing rib 154. Although shown having an I-shaped cross section, the stout wing rib 154 may have any one of a variety of alternative cross-sectional shapes, including a channel-shaped cross section (not shown) similar to the above-described inboard wing ribs 152 (FIG. 4) or outboard wing ribs 158 (FIG. 4).

As shown in FIGS. 13-15 and 17, the front spar 130 and the rear spar 132 each have upper and lower spar outer flanges 140 to which the upper skin panel 190 and the lower skin panel 192 are respectively coupled. As mentioned above, the spar outer flanges 140 of the front spar 130 and rear spar 132 may be bonded to the upper skin panel 190 and lower skin panel 192. Examples of bonding may comprise co-bonding of an uncured spar (front spar 130 and rear spar 132) to a cured skin panel (upper skin panel 190 and lower skin panel 192). Alternatively, bonding may comprise secondary bonding of a cured spar to a cured skin panel via an adhesive layer 220 (FIG. 17). In a still further example, bonding may comprise co-curing an uncured spar with an uncured skin panel. In addition, mechanical fasteners 300 may assist in securing the spar outer flanges 140 to the skin panels 190, 192.

As shown in FIG. 17, the lower skin panel 192 (and the upper skin panel 190) may each have a panel thickness 196 that locally increases along the spanwise direction toward the padup regions 198 at the spanwise location of the stout wing rib 154. Each padup region 198 comprises a local increase in composite plies 310 on top of the acreage plies 194 of the upper skin panel 190 and lower skin panel 192. Each padup region 198 underneath the spar outer flanges 140 may extend continuously (i.e., at a constant thickness) along the spanwise direction from the stout wing rib 154 toward the wing tip 124 (FIG. 4).

As shown in FIG. 17, the panel thickness 196 of the lower skin panel 192 (and the upper skin panel 190) gradually increases along the outboard direction. The increase in panel thickness 196 occurs within a ramp region 200 toward a full thickness of the padup region 198 starting at a spanwise location inboard of the stout wing rib 154. Within the ramp region 200, the panel thickness 196 may increase at a length-to-height ratio of no less than 2:1 to preferably provide for a relatively shallow ramp angle of the ramp region 200. The spar outer flange 140 has a flange thickness 142 that may decrease with the increase in panel thickness 196 within the ramp region 200. In this regard, the flange thickness 142 may decrease in direct proportion to the increase in panel thickness 196 within the ramp region 200 such that a combined thickness of the skin panel (upper skin panel 190 or lower skin panel 192) and the spar outer flange 140 is constant within the ramp region 200. The padup region 198 is preferably at full thickness at least within the width of the rib outer flanges 170 of the stout wing rib 154.

The increase in panel thickness 196 in the ramp region 200 and the corresponding decrease in flange thickness 142 of the spar outer flanges 140 may facilitate the transfer of bending loads from the outboard wing portion 156 to the inboard wing portion 150 at the stout wing rib 154. In addition, the increased thickness of the spar outer flanges 140 in the inboard wing portion 150 (i.e., inboard of the stout wing rib 154) may result in the front spar 130 and rear spar 132 having increased bending load capability (i.e., higher stiffness) relative to a lower bending load capability (i.e., lower stiffness) of the front spar 130 and rear spar 132 in the outboard wing portion 156 (i.e., outboard of the stout wing rib 154). As mentioned above, the reduced bending stiffness of the outboard wing portion 156 may result in a reduction in structural mass.

Figure 20:
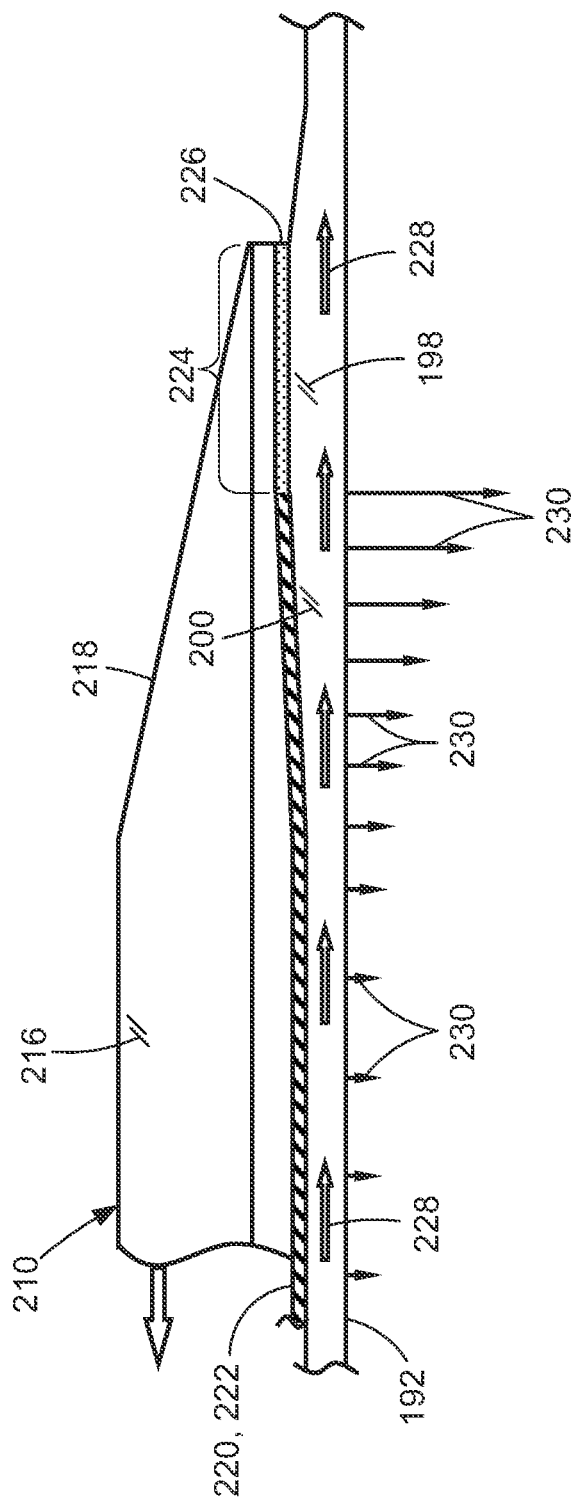
FIG. 20 is a magnified view of the portion of the wing assembly identified by reference numeral 20 of FIG. 19 and illustrating the distribution of shear stresses in the adhesive layer.
Figure 21:
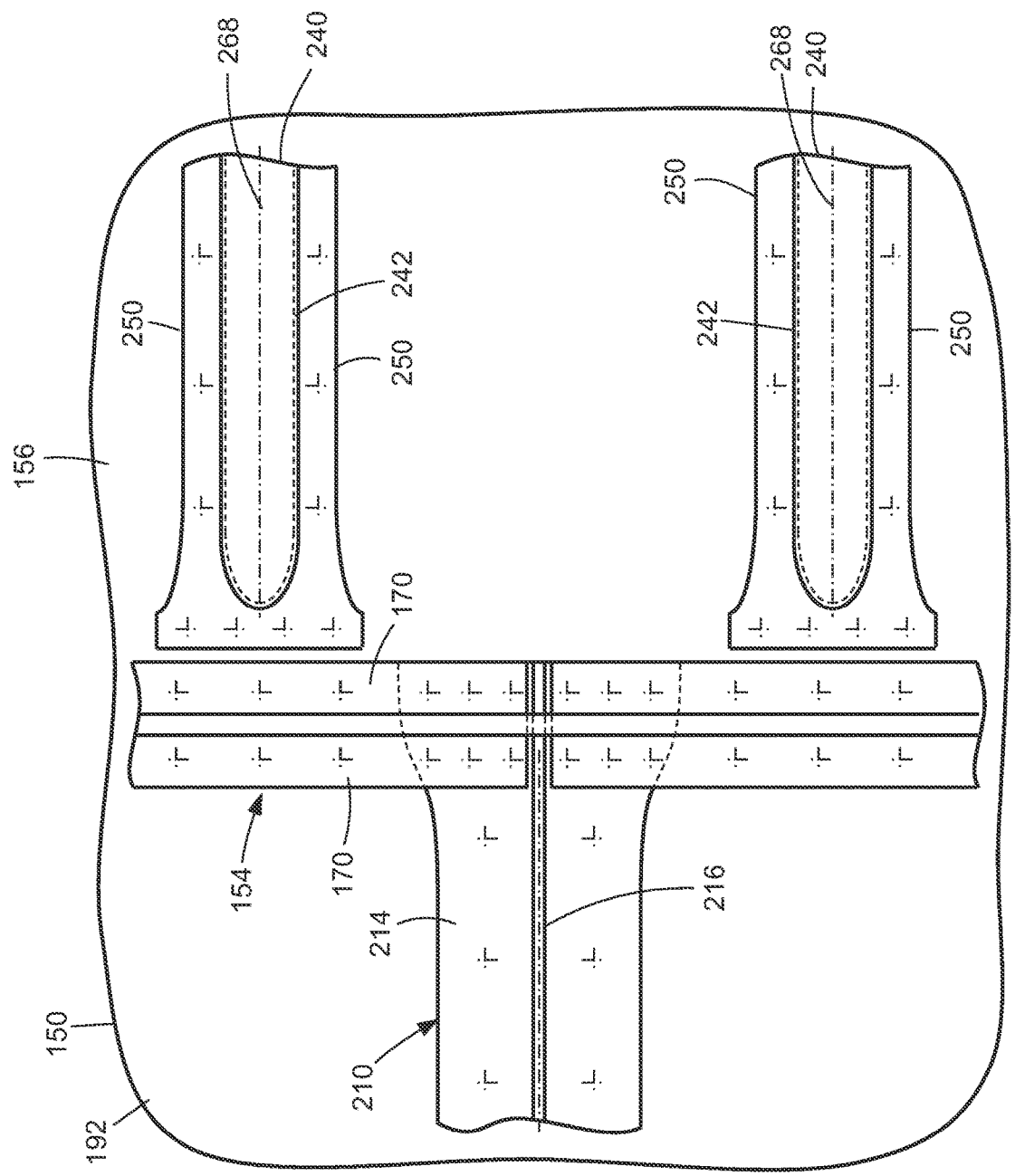
FIG. 21 is a top-down view of the wing assembly taken along line 21-21 of FIG. 18 and illustrating a local increase in the width of the stringer flanges and a local increase in the width of the bead stiffener flanges at the location of the stout wing rib.
Figure 22:
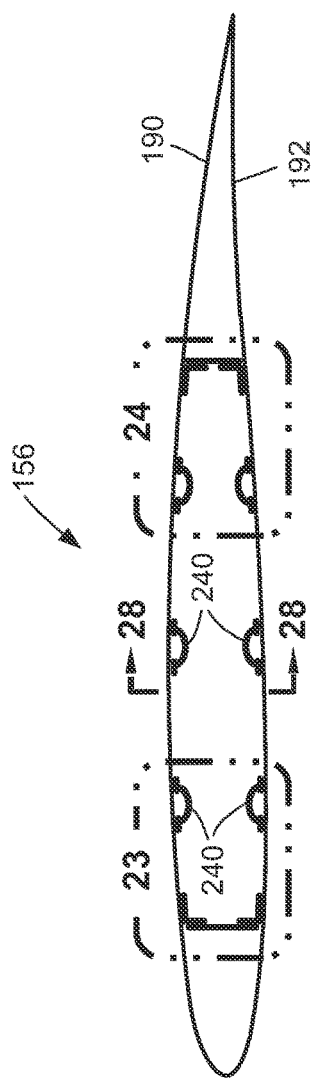
FIG. 22 is a sectional view of an outboard wing portion of the wing assembly taken along line 22-22 of FIG. 3 and illustrating bead stiffeners coupled to the upper and lower skin panel.

Referring to FIGS. 18-21, shown are examples of the termination of the stringers 210 at the stout wing rib 154. As mentioned above, each one of the stringers 210 has a stringer flange 214 and at least one stringer web 216 extending outwardly from the stringer flange 214. In addition, each stringer 210 has a stringer runout 218 at the stringer terminal end at the stout wing rib 154. As shown in FIGS. 18-19, the stringer web 216 gradually decreases in height along the stringer runout 218 at the terminal end. The gradual decrease in the height of the stringer web 216 result in a tapering of the stiffness of the stringer 210, which advantageously reduces out-of-plane peel-off loads that otherwise tend to pull the stringer flange 214 away from the skin panel 190, 192 at the stringer terminal end. As shown in FIG. 21, the stringer flange 214 may be widened at the location where the stringer flanges 214 are coupled to the rib outer flanges 170 of the stout wing rib 154 as a means to distribute the loads from the stringers 210 into the skin panels 190, 192 and the stout wing rib 154.

Referring to FIGS. 19-20, the stringer flange 214 of each stringer 210 may be coupled to the upper skin panel 190 or the lower skin panel 192 via bonding. The bonded interface between the stringer flanges 214 and the skin panels 190, 192 may be described as a bondline 222. The stringers 210 may be bonded to the lower skin panel 192 (and the upper skin panel 190) via co-bonding of an uncured stringer 210 to a cured skin panel (upper skin panel 190 or lower skin panel 192). In another example, bonding may comprise the secondary bonding of a cured stringer 210 to a cured skin panel via an adhesive layer 220. In a still further example, bonding may comprise co-curing an uncured stringer 210 with an uncured skin panel.

Referring still to FIGS. 19-20, the lower skin panel 192 (and the upper skin panel 190) may each include a localized padup region 198 proximate the stringer terminal end of each stringer 210 at the stout wing rib 154. The padup region 198 in the skin panels 190, 192 may result in the skin panels 190, 192 carrying a greater portion of the load otherwise carried by the stringers 210 at the stringer terminal end, and which may reduce peel-off forces that may otherwise urge or pull the stringer flanges 214 away from the skin panels 190, 192 during wing bending. The panel thickness 196 of the upper skin panel 190 and the lower skin panel 192 may be gradually increased within a ramp region 200 toward a full thickness of the padup region 198 starting at a spanwise location inboard of the stout wing rib 154. Similar to the above-described padup regions 198 for the front spar 130 (e.g., (FIG. 13) and rear spar 132 (FIG. 14), the ramp regions 200 for the stringers 210 may gradually increase the panel thickness 196 at a length-to-height ratio of no less than 2:1 to avoid stress concentration in the bondline 222 coupling the stringers 210 to the skin panels 190, 192. The stringer flange 214 of each stringer 210 may have a flange thickness 142 that decreases in proportion to the increase in panel thickness 196 within the ramp region 200, so as to maintain a constant combined thickness of the skin panel (upper skin panel 190 or lower skin panel 192) and the stringer flange 214. The localized padup regions 198 in the upper skin panel 190 and lower skin panel 192 are preferably at full thickness at least within the width of the rib outer flanges 170 of the stout wing rib 154.

Referring still to FIGS. 19-20, the bondline 222 (e.g., the adhesive layer 220) between the skin panel 190, 192 and the stringer flange 214 may be terminated at a distance of no more than 0.50 inch (e.g., more preferably no more than 0.25 inch) from the stringer terminal end. The termination of the bondline 222 inboard of the stringer terminal end may result in a flange-skin gap 224 between the stringer flange 214 and the skin panel 190, 192. In the flange-skin gap 224, the stringer flange 214 may be non-bonded to the skin panel. The flange-skin gap 224 may be filled with a non-adhesive gap filler 226 (e.g., a layer of fiberglass) that is non-binding to the stringer flange 214 and/or the skin panel 190, 192. By terminating the bondline 222 (e.g., the adhesive layer 220) at a distance from the tip of the stringer terminal end, high shear stresses 228 in the bondline 222 (e.g., due to wing bending) may be directed away from the stringer terminal end. For example, FIG. 20 shows shear stresses 228 and pulloff stresses 230 in the bondline 222 (e.g., adhesive layer 220). The relative magnitude of the pulloff stresses 230 is represented by the different lengths of the arrows. As shown, the highest magnitude of pulloff stresses 230 are maintained at a distance from the tip of the stringer terminal end. By keeping the high pulloff stresses 230 away from the away from the tip of the stringer terminal end, creep or shear stresses in the bondline 222 between the stringer 210 and the skin panel 190, 192 may be minimized, which may mitigate or eliminate the initiation of cracks in the bondline 222 that may otherwise propagate along the length of the stringer 210.

Figure 25:
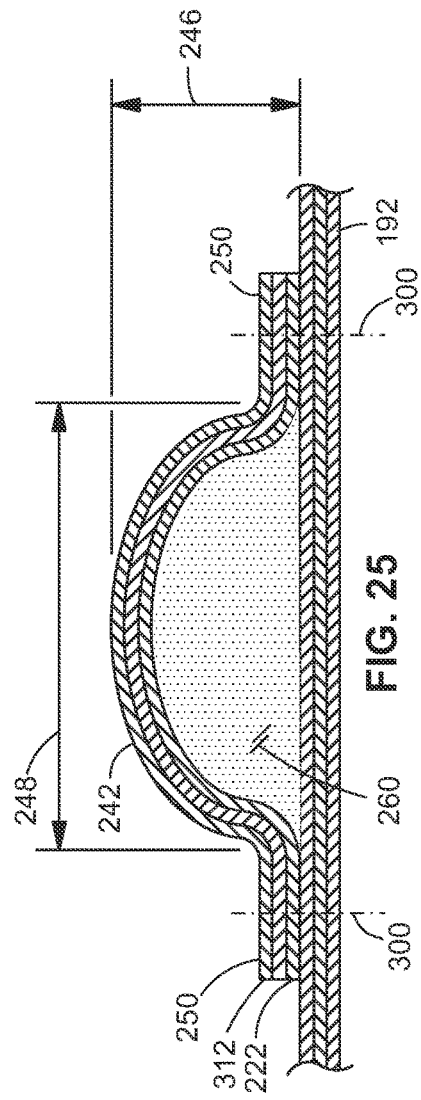
FIG. 25 is a magnified sectional view of the portion of the outboard wing portion identified by reference number 25 of FIG. 23 and illustrating an example of a bead stiffener coupled to the lower skin panel.
Figure 24:
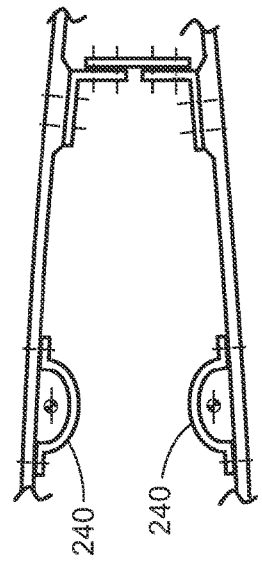
FIG. 24 is a magnified view of the portion of the outboard wing portion identified by reference number 24 of FIG. 22 and illustrating a localized padup region in both the upper skin panel and the lower skin panel at the location of the rear spar.
Figure 26:
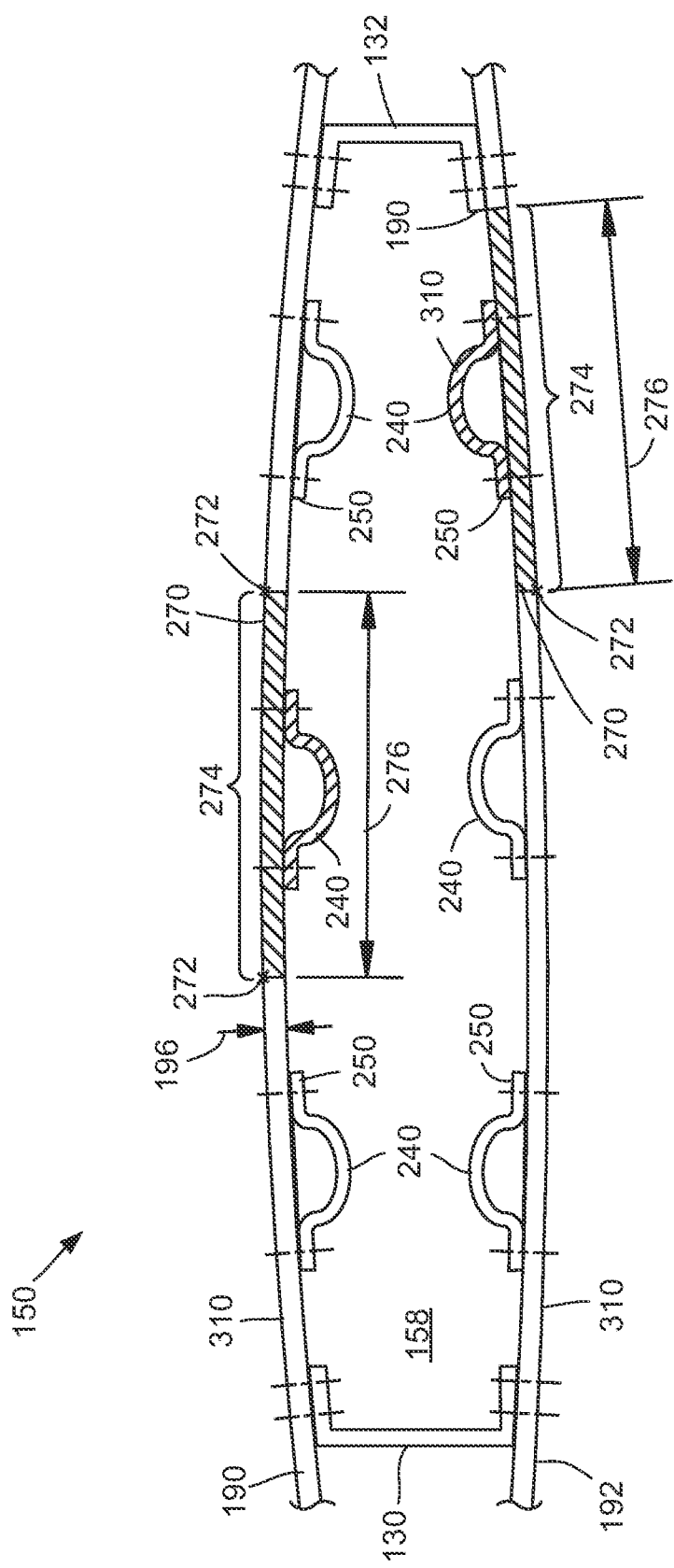
FIG. 26 is a sectional view of an example of an outboard wing bay of the outboard wing portion having three bead stiffeners coupled to each of the upper and lower skin panels, and further showing on each of the upper and lower skin panels an example of a bead-skin portion cross-sectional area corresponding to a combined bead-skin portion bending stiffness of a skin panel portion and associated bead stiffener.
Figure 27:
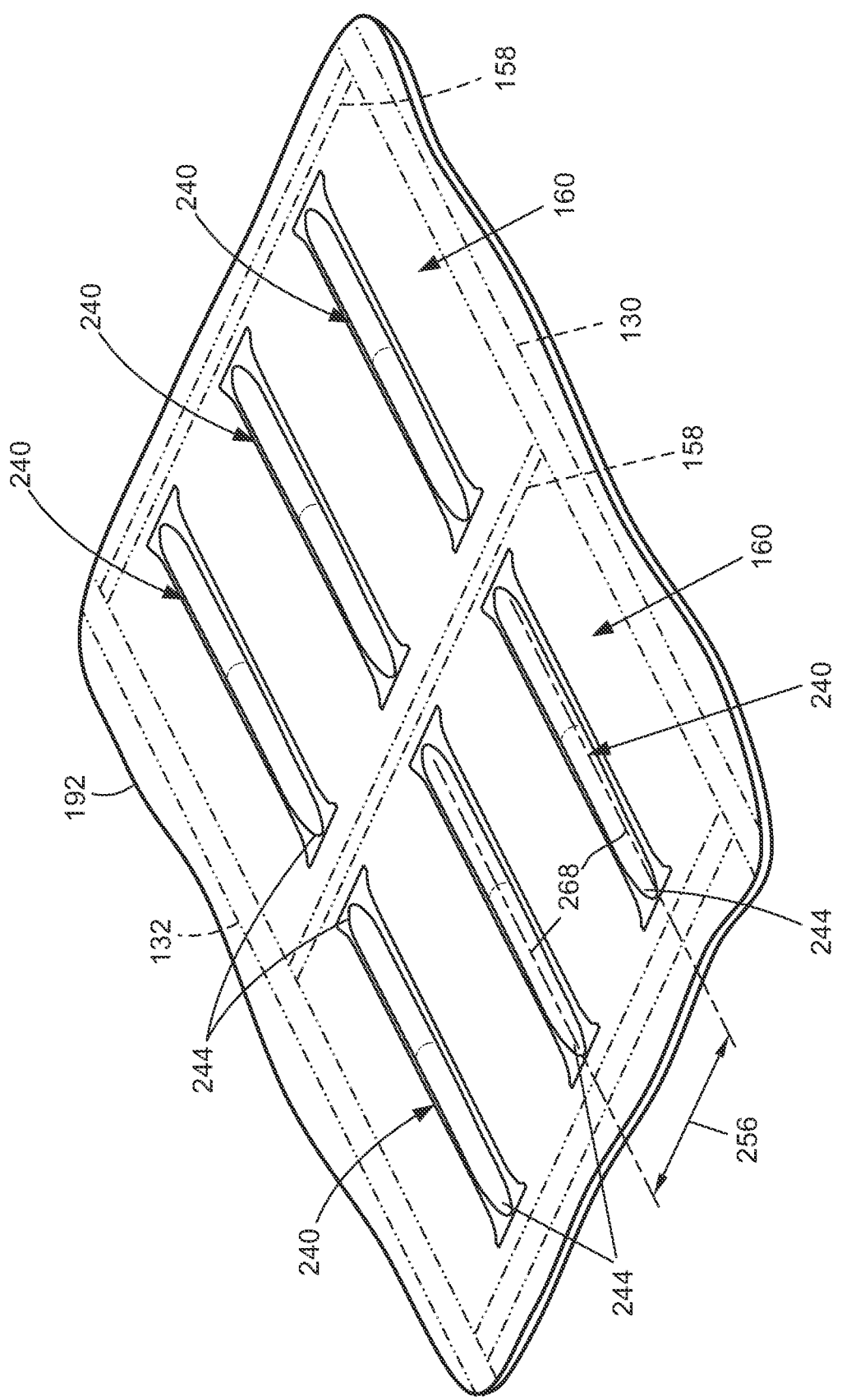
FIG. 27 is a perspective view of a portion of the outboard wing portion illustrating bead stiffeners coupled to the skin panel, and further illustrating the cap ends of each bead stiffener in each outboard wing bay terminating respectively proximate the outboard wing ribs that define the outer wing bay.

Referring now to FIGS. 4 and 21-29, shown are a plurality of bead stiffeners 240 for stiffening the upper skin panel 190 and lower skin panel 192 in the outboard wing portion 156. Each bead stiffener 240 has a bead stiffener cap 242 and opposing bead stiffener flanges 250. The bead stiffener cap 242 of each bead stiffener 240 extends between opposing cap ends 244 (FIG. 27). The cap ends 244 of each bead stiffener 240 may be closed as shown in FIG. 27. Each bead stiffener 240 may be symmetrical about a bead vertical axis (not shown). Each of the bead stiffeners 240 extends along a spanwise direction within the outboard wing bays 160. The bead stiffeners 240 within each outboard wing bay 160 are located at spaced intervals from each other along a chordwise direction. For example, each bead stiffener 240 has a bead centerline 288 extending along a lengthwise direction of the bead stiffener 240. The bead stiffeners 240 may be spaced apart from each other at a chordwise spacing 256 of from 6-11 inches between bead centerlines 288 of adjacent bead stiffeners 240. More preferably, the chordwise spacing 256 is between 7.5 to 9.5 inches between bead centerlines 288. The chordwise spacing 256 between bead stiffeners 240 in each outboard wing bay 160 is preferably uniform as a means to maintain a uniform chordwise mass distribution of the outboard wing portion 156.

As shown in FIG. 27, the cap ends 244 of each bead stiffener 240 in each outboard wing bay 160 terminate respectively proximate the pair of outboard wing ribs 158 that define the outboard wing bay 160. For example, as shown in FIG. 4, the outboard wing bay 160 immediately adjacent to the stout wing rib 154 has three discrete bead stiffeners 240. The bead stiffeners 240 are discrete in the sense that none of the bead stiffener caps 242 of any of the bead stiffeners 240 extends across any of the outboard wing ribs 158, which avoids the need for rib cutouts 164 (FIG. 4), which reduces manufacturing, assembly, and maintenance costs. For example, the elimination of rib cutouts 164 avoids the need for installing shear-tie brackets (not shown) otherwise required for transferring load between the outboard wing ribs 158 and the skin panels 190, 192. In addition, avoiding shear-tie brackets avoids the time-consuming process of shimming, and may result in a lighter weight structure. Furthermore, by confining each bead stiffener 240 to a single inboard wing bay 153, the damage tolerance of the outboard wing portion 156 may be compartmentalized or limited to individual outboard wing bays 160.

As shown in FIG. 25, the bead stiffeners 240 may be formed of fabric plies 312 to avoid the above-mentioned warpage and/or wrinkling associated with unidirectional plies 314. As described in greater detail below, each of the bead stiffeners 240 may have a relatively thin gauge or thickness to reduce potentially high peel-off forces at the edges of the bead stiffener flanges 250, thereby improving the strength of the bondline 222 between the bead stiffener flanges 250 and the skin panels 190, 192. The bead stiffeners 240 may be separately laid up and co-cured with the skin panels 190, 192 in a single cure cycle. Alternatively, the bead stiffeners may be co-bonded with the skin panels 190, 192. In a still further example, the bead stiffeners 240 may be cured separately from the skin panel, and then secondary bonded to the skin panels 190, 192. Mechanical fasteners 300 may also secure the bead stiffener flanges 250 to the skin panels 190, 192.

Figure 23:
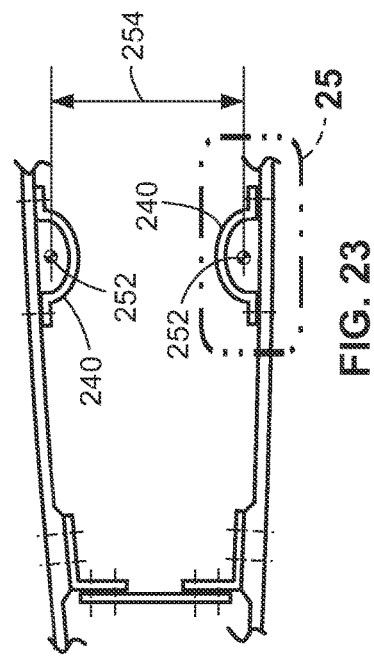
FIG. 23 is a magnified view of a portion of the outboard wing portion identified by reference numeral 23 of FIG. 22 and illustrating a relatively large wing effective distance between the area centroids of the bead stiffeners at the upper skin panel and lower skin panel.

Referring to FIGS. 22-25, the bead stiffener cap 242 of each bead stiffener 240 may have a rounded sectional shape, such as a semi-circular or semi-oval cross sectional shape, although other cross-sectional shapes are contemplated. In some examples, each bead stiffener cap 242 cross-sectional shape may have a ratio of bead stiffener width 248 to bead stiffener height 246 of no less than 2. In this regard, the bead stiffener cap 242 may have a relatively low bead stiffener height 246. For example, each bead stiffener 240 may have a bead stiffener height 246 of less than 3 inches in contrast to a conventional blade stringer or hat section stringer (not shown) which may have a height of greater than 3 inches. As shown in FIG. 23, the relatively shallow bead stiffener height 246 of each bead stiffener 240 may result in upper skin panel 190 and lower skin panel 192 each having an area centroid 252 that is nearer to the skin panel than the area centroid of conventional stringers. As a result of the area centroid being closer to the skin panels, the outboard wing portion 156 has a larger wing effective thickness 254 than the wing effective thickness of an outboard wing portion stiffened by stringers (not shown). The increased wing effective thickness 254 of the outboard wing portion 156 may increase the efficiency of the bending load-carrying capability of the outboard wing portion 156, and may result in a reduction in structural mass of the outboard wing portion 156.

In some examples of the wing assembly 120, the bead stiffeners 240 in an outboard wing portion 156 may have the same cross-sectional shape and size as a means to simplify manufacturing and assembly. Furthermore, the cross-sectional shape and size of the bead stiffener caps 242 may be constant along the lengthwise direction of the bead stiffeners 240. To further simplify manufacturing, each bead stiffener 240 may have the same ply stackup (i.e., stacking sequence) of fabric plies 312.

The bead stiffener cap 242 of each bead stiffener 240 may be generally hollow. Alternatively, the bead stiffener cap 242 may be filled with a foam member 290 (FIG. 25). The foam member 290 may be a lightweight material that preferably remains stable at elevated temperatures required for curing of the fabric plies 312 that make up the bead stiffener 240. In one example, the foam member 290 may be formed of a closed-cell foam such as Rohacell™ foam. However, the foam member 290 may be comprised of any one a variety of foam materials. The foam member 290 may function as a layup mandrel and/or cure mandrel for laying up and/or curing the fabric plies 312 that make up the bead stiffener 240. The foam members 290 may optionally remain within the bead stiffener 240 after curing is complete, and may thereby fill an otherwise hollow cavity in compliance with FAA flammability requirements. The existence of the foam member 290 within the bead stiffener 240 may also increase the bending stiffness of the bead stiffener 240, which may result in an increase in the bending stiffness of the upper skin panel 190 and lower skin panel 192.

Referring to FIG. 26, shown is a section view of an example of an outboard wing bay 160 of an outboard wing portion 156 having three bead stiffeners 240 coupled to each of the upper and lower skin panels 190, 192. As mentioned above the bead stiffeners 240 may have a relatively thin gauge which advantageously allows the bead stiffeners 240 to flex with the skin panels 190, 192 during spanwise bending of the outboard wing portion 156, thereby reducing or avoiding the development of high peel-off moments at the edges of the bead stiffener flanges 250. The upper skin panel 190 and lower skin panel 192 may be stiffened according to the post-buckled wing panel stiffening concept in which unsupported portions of the skin panels 190, 192 between discrete bead stiffeners 240 are designed to buckle at or above limit load while the bead stiffeners 240 are designed to resist buckling at or above the same limit load on the outboard wing portion 156. Toward this end, the bead stiffeners 240 may be specifically configured to have a bead bending stiffness in the spanwise direction that is lower than the combined bead-skin portion bending stiffness of the bead stiffener 240 and a skin panel portion 270 (i.e., of the upper skin panel 190 or lower skin panel 192) in the spanwise direction. For example, each bead stiffener 240 may be configured to have a bead bending stiffness that is approximately 40-60 percent of the combined bead-skin portion bending stiffness of the bead stiffener 240 and a skin panel portion 270. More preferably, the bead bending stiffness is preferably 45-55 percent of the combined bead-skin portion bending stiffness. The bead bending stiffness may be measured at the midpoint along the length of the bead stiffener 240. The skin bending stiffness is the stiffness of the skin panel portion 270 located directly underneath and attached to or supported by the bead stiffener 240, and may be measured at the same spanwise location as where the bead bending stiffness of the bead stiffener 240 is measured.

Maintaining the bead bending stiffness at between 40-60 percent of the combined bead-skin portion bending stiffness limits the magnitude of peel-off forces in the bondline between the bead stiffener 240 and the skin panel 190, 192 to a level that prevents separation of the edges of the bead stiffener flanges 250 from the inner surface of the skin panel 190, 192, while also preventing buckling of the unsupported segment of the skin panel 190, 192 between adjacent pairs of bead stiffeners 240 when the outboard wing portion 156 is at limit load (i.e., the maximum spanwise bending load expected during service). The chordwise spacing 256 between the bead stiffeners 240 may be set at a distance such that buckling in the unsupported segment of the skin panel between adjacent bead stiffeners 240 occurs at or above limit load. However, in some examples of the wing assembly 120, the stiffness requirements may be such that bead stiffeners 240 may be omitted from one or more of the outboard wing bays 160, such as the outboard wing bays located furthest outboard on the wing assembly 120.

As mentioned above, each bead stiffener 240 may have a bead bending stiffness (i.e., in the spanwise direction) that is approximately 40-60 percent of the combined bead-skin portion bending stiffness (i.e., in the spanwise direction) of the bead stiffener 240 and a skin panel portion 270 supported by the bead stiffener 240. The cross-sectional area of one of the bead stiffeners 240 and associated skin panel portion 270 is represented by the crosshatched area in the upper skin panel 190 and lower skin panel 192 in FIG. 26, and identified as the bead-skin portion cross-sectional area 274. For bead stiffeners 240 that are located between an adjacent pair of bead stiffeners 240, the skin panel portion 270 has a panel portion width 276 that extends between midpoints 272 respectively located on opposite sides of the bead stiffener 240. Each midpoint 272 is located midway between the edge of the bead stiffener flange 250 of the bead stiffener 240, and the edge of the bead stiffener flange 250 of an immediately adjacent bead stiffener 240, as shown in the upper skin panel 190 of FIG. 26. For bead stiffeners 240 that are located between a spar (e.g., the front spar 130 or the rear spar 132) and another bead stiffener 240, the panel portion width 276 extends between the spar outer flange 140 on one side of the bead stiffener 240 and, on an opposite side of the bead stiffener 240, the midpoint 272 between the edge of the bead stiffener flange 250 of the bead stiffener 240, and an immediately adjacent bead stiffener 240, as shown in the lower skin panel 192 of FIG. 26. In each example, the panel portion width 276 of the skin panel portion 270 is centered on the bead stiffener 240.

As known in the art, bending stiffness of a structural member is a function of the modulus of elasticity (E) of the structural member, and the second moment of inertia (I) of the structural member. The second moment of inertia (I) is a function of the cross-sectional area (A) of the structural member. The modulus of elasticity (E) is a mechanical property of the material (e.g., graphite-epoxy composite material) of the structural member, and represents the stiffness of the material. The second moment of inertia (I) is a function of the shape and size of the cross-sectional area of the structural member.

The magnitude of the chordwise skin bending stiffness of a skin panel portion 270 may be dictated at least in part by the ply composition, ply quantity, and ply stacking sequence of the composite plies 310 that make up the skin panel 190, 192, and by the panel portion cross-sectional area 274, which may be a function of the panel portion width 276 and the panel thickness 196. Similarly, the magnitude of the chordwise (i.e., lengthwise) bead bending stiffness of a bead stiffener 240 may be dictated at least in part by the ply composition, ply quantity, and ply stacking sequence of the composite plies 310 that make up the bead stiffener 240, and also by the size (e.g., bead stiffener width 248, bead stiffener height 246—FIG. 25) and shape (e.g., radius of curvature of the bead stiffener cap 304—FIG. 25) of the bead stiffener cross-sectional area.

In addition to a preferred 40-60 percent bending stiffness ratio of bead bending stiffness to combined bead-skin portion bending stiffness, the bead stiffeners 240 may also have a lower axial stiffness (i.e., in the spanwise direction) than the combined bead-skin portion axial stiffness (i.e., in the spanwise direction) of the bead stiffener 240 and the skin panel portion 270 supported by the bead stiffener 240. Bead axial stiffness is the stiffness along the lengthwise direction of the bead stiffener 240. The combined bead-skin axial stiffness is the bead axial stiffness combined with the in-plane stiffness of the skin panel portion 270 that is supported by the bead stiffener 240. The in-plane stiffness of the skin panel portion 270 is measured parallel to the lengthwise direction of the bead stiffener 240. As known in the art, axial stiffness is a measure of the resistance of a structural member to in-plane deformation when subjected to an axial load. The axial stiffness of the structural member is a function of the modulus of elasticity (E) of the structural member, and the cross-sectional area (A) of the structural member.

In the present disclosure, axial loading of the bead stiffeners 240 and skin panels 190, 192 may occur in response to spanwise bending of the outboard wing portion 156 due to aerodynamic loading of the skin panels 190, 192. For example, upward bending of the outboard wing portion 156 may induce axial (i.e., in-plane) compression in the upper skin panel 190 and associated bead stiffeners 240, and axial (i.e., in-plane) tension in the lower skin panel 192 and associated bead stiffeners 240. The bead stiffeners 240 may have a 40-60 percent axial stiffness ratio of bead axial stiffness to combined bead-skin portion axial stiffness to reduce the magnitude of stresses in the bondline coupling the bead stiffeners 240 to the skin panels 190, 192. More preferably, the bead axial stiffness is 45-55 percent of the combined bead-skin portion axial stiffness. By providing the bead stiffeners 240 with a lower bead axial stiffness than the combined bead-skin portion axial stiffness, shear stress in the bondline may be reduced which may prevent the initiation of cracks in the bondline that may otherwise propagate along the length of the bead stiffeners 240 and result in separation of the bead stiffeners 240 from the skin panels 190, 192.

Referring to FIG. 21, shown is a top view of the lower skin panel 192 at the location of the stout wing rib 154, and illustrating a stringer 210 mounted to the lower skin panel 192 on one side of the stout wing rib 154, and a plurality of discrete bead stiffeners 240 mounted to the lower skin panel 192 on the opposite side of the stout wing rib 154. The width of the bead stiffener flanges 250 at the ends of the bead stiffeners 240 may be flared for improving the distribution of bead stiffener loads into the skin panels 190, 192, and thereby reducing peel-off forces in the bondline 222 between the bead stiffeners 240 and the skin panels 190, 192. As shown in FIG. 21, the bead stiffeners 240 may be non-aligned with the stringers 210. However, in other examples not shown, the bead stiffeners 240 may be aligned with the stringers 210. At the stout wing rib 154, the upper skin panel 190 and the lower skin panel 192 may include localized padup regions 198 (e.g., FIG. 19) proximate the end of each bead stiffener 240. For examples where the bead stiffeners 240 are non-aligned with the stringers 210, padup regions 198 on the outboard side of the wing stout rib may provide a conduit for transferring panel loads flowing from the outboard wing portion 156 to the inboard wing portion 150. In this regard, the bead stiffeners 240 in the outboard wing portion 156 may transfer bending loads into the skin panels 190, 192 at the padups regions 198, and the stout wing rib 154 may shear the panel loads into the stringers 210 and skin panels 190, 192 in the inboard wing portion 150.

Referring to FIGS. 27-28, shown is a cross-sectional view of the wing assembly 120 outboard of the stout wing rib 154. In the examples shown, the stout wing rib 154 has a channel-shaped cross-section as an alternative to the I-shaped cross section shown in FIG. 16. FIGS. 27-28 show two different configurations of the bead stiffeners 240. FIG. 28 shows an example in which an entirety of each bead stiffener 240, including the bead stiffener cap 242 and the bead stiffener flanges 250, is confined within each wing bay. FIG. 29 shows an example in which the bead stiffener flanges 250 of the bead stiffener 240 extend across one or more outboard wing bays 160, although the cap ends 244 of the bead stiffener 240 within each outboard wing bay 160 terminate proximate the outboard wing ribs 158 that define the inboard wing bay 153. In this regard, the bead stiffener flanges 250 are sandwiched between the rib outer flanges 170 and the skin panel (e.g., the upper skin panel 190 or the lower skin panel 192).

Figure 30:
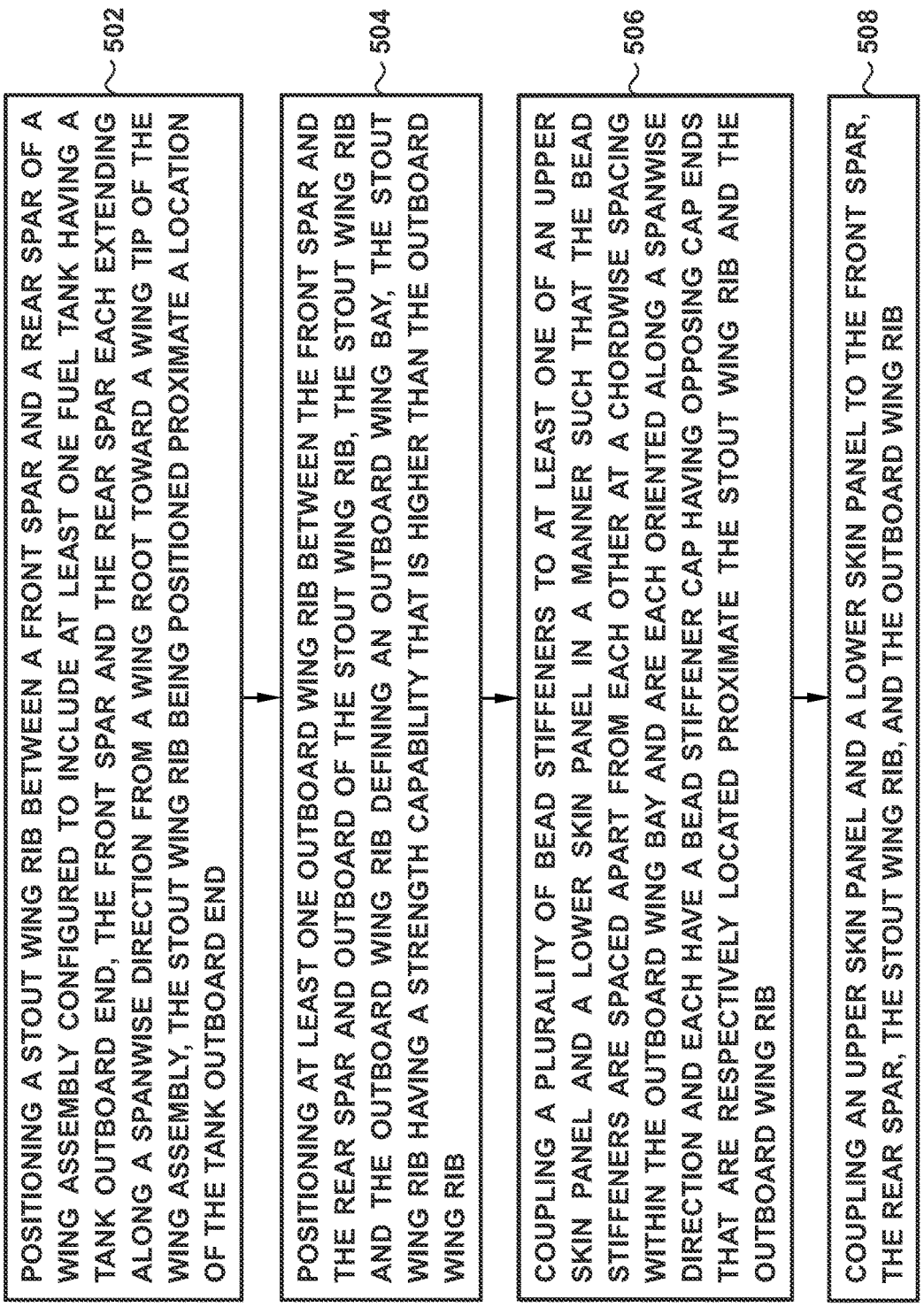
FIG. 30 is a flowchart of operations included in a method of manufacturing a wing assembly.

FIG. 30 is a flowchart of operations included in a method 400 of manufacturing a wing assembly 120. Step 402 of the method 400 includes positioning a stout wing rib 154 between a front spar 130 and a rear spar 132 of a wing assembly 120 configured to include at least one fuel tank 180 having a tank outboard end 186. As described above and shown in FIGS. 1-4, the front spar 130 and the rear spar 132 each extend along a spanwise direction from a wing root 122 toward a wing tip 124 of the wing assembly 120. The stout wing rib 154 is positioned proximate the tank outboard end 186. For example, the stout wing rib 154 may serve as the tank outboard end 186 of the outermost fuel tank 180 in the wing assembly 120. The stout wing rib 154 may have a strength capability that is higher than the strength capability of the inboard wing ribs 152 and/or the outboard wing ribs 158. The increased strength capability of the stout wing rib 154 may be the result of an increased thickness of the rib outer flanges 170 and/or an increased thickness of the rib web 162 of the stout wing rib 154 relative to the thickness of the rib outer flanges 170 and/or the rib web 162 of the remaining wing ribs 152, 158 of the wing assembly 120.

Step 404 of the method 400 includes positioning at least one outboard wing rib 158 between the front spar 130 and the rear spar 132, and locating the outboard wing rib 158 outboard of the stout wing rib 154. In the example shown, the wing assembly 120 may include a plurality of outboard wing ribs 158. As shown in FIGS. 2-4, the stout wing rib 154 and the outboard wing rib 158 define an outboard wing bay 160. A plurality of outboard wing ribs 158 may be positioned at spaced locations between the stout wing rib 154 and the wing tip 124 to define a plurality of outboard wing bays 160 between adjacent pairs of the outboard wing ribs 158.

Step 406 of the method 400 includes coupling a plurality of bead stiffeners 240 to the upper skin panel 190 and/or the lower skin panel 192 in a manner such that when the upper skin panel 190 and lower skin panel 192 are coupled to the wing assembly 120, the bead stiffeners 240 are spaced apart from each other at a chordwise spacing 256 within the outboard wing bay 160 (e.g., FIG. 4), and such that the bead stiffeners 240 are oriented along a spanwise direction and each have a pair of bead stiffener flanges 250 and a bead stiffener cap 242 having opposing cap ends 244 that are respectively located proximate the stout wing rib 154 and the outboard wing rib 158 as shown in FIGS. 4 and 26-28. In some examples, the method may include spacing the bead stiffeners 240 apart from each other at a chordwise spacing 256 of from 6-11 inches and, more preferably, at a chordwise spacing 256 of 7.5-9.5 inches. The chordwise spacing 256 between the bead stiffeners 240 within each outboard wing bay 160 may be adjusted at least in part on the stiffness requirements at the spanwise location of the outboard wing bay 160.

The method 400 may additionally comprise laying up each bead stiffener 240 using fabric plies 312. Each bead stiffener 240 may be devoid of unidirectional plies 314 which may avoid undesirable warpage and/or wrinkling. As described above and shown in FIG. 25, each bead stiffener 240 may include a bead stiffener cap 242 extending between an opposing pair of bead stiffener flanges 250. The step of laying up the bead stiffeners 240 may comprise laying up each bead stiffener 240 to have a bead stiffener cap 242 that has a cross section that is constant along a lengthwise direction of the bead stiffener 240. Each bead stiffener 240 may be laid up such that the bead stiffener cap 242 has a rounded cross-sectional shape and the cap ends 244 are closed. For example, in FIG. 25, the bead stiffener cap 242 has a semi-circular or semi-oval cross-sectional shape. However, the bead stiffeners 240 may be laid up with any one of a variety of different cross-sectional shapes.

In some examples, the bead stiffeners 240 may be laid up over a foam member 290 as mentioned above. In this regard, the foam member 290 may be contoured complementary to a final shape of the bead stiffener, and may serve as a layup mandrel and/or curing mandrel. Each stiffener may be separately laid up over a foam member 290 and then co-cured with the upper skin panel 190 and/or lower skin panel 192 (e.g., in a single cure cycle). In another example, each of the bead stiffeners 240 may be laid up over a foam member 290 and then co-bonded in the uncured state (e.g., green state) to a cured skin panel (e.g., upper skin panel 190 or lower skin panel 192). In a still further example, bead stiffeners 240 in the cured state may be co-bonded to a skin panel in the uncured state. Even further, bead stiffeners 240 in the cured state may be secondary bonded to skin panels in the cured state using an adhesive layer 220 between the bead stiffener flanges 250 and a skin panel 190, 192. The foam member 290 may optionally be removed from each bead stiffener 240 after curing of the bead stiffener 240. However, in other examples, the foam member 290 may be retained within the bead stiffeners 240 during the life of the wing assembly 120. In such an arrangement, the foam members 290 may increase the bending stiffness of the bead stiffeners 240. The bead stiffeners 240 may be coupled to the skin panels 190, 192 via bonding (e.g., co-curing, co-bonding, or secondary bonding) and/or via mechanical fastening of the bead stiffener flanges 250 to the skin panels 190, 192.

Referring briefly to FIG. 28, the step of coupling the bead stiffeners 240 to the skin panels 190, 192 may include coupling the bead stiffeners 240 to the upper skin panel 190 and/or the lower skin panel 192 in a manner such that an entirety of each bead stiffener 240 is contained within one of the outboard wing bays 160. Advantageously, such an arrangement avoids the need for rib cutouts 164 in the outboard wing ribs 158 for passage of a bead stiffener 240 across the outboard wing rib 158. However, in another example shown in FIG. 29, the step of coupling the bead stiffeners 240 to the skin panels 190, 192 may include laying up one or more of the bead stiffeners 240 such that only the bead stiffener flanges 250 extend from one outboard wing bay 160, across at least one of the outboard wing ribs 158, and into at least one other outboard wing bay 160. However, in the arrangement of FIG. 29, each bead stiffener cap 242 is contained within an outboard wing bay 160. In this regard, a bead stiffener 240 may include a series of bead stiffener caps 242 respectively contained within a plurality of outboard wing bays 160, and the bead stiffener 240 may include a single pair of bead stiffener flanges 250 extending across multiple outboard wing ribs 158.

Step 408 of the method 400 includes coupling the upper skin panel 190 and the lower skin panel 192 to the front spar 130, the rear spar 132, the stout wing rib 154, and the one or more wing ribs 152, 158. Prior to coupling the upper skin panel 190 and lower skin panel 192 to the spars 130, 132 and wing ribs 152, 158, the method 400 may further include laying up, using a plurality of acreage plies 194, the upper skin panel 190 and/or the lower skin panel 192 such that when coupled to the wing assembly 120, the acreage plies 194 (i.e., excluding localized padup regions 198) have a panel thickness 196 that is constant along the spanwise direction. For example, the panel thickness 196 of the upper skin panel 190 and/or the lower skin panel 192 may be constant at least between the stout wing rib 154 and the wing tip 124. The acreage plies 194 may consist of unidirectional plies 314, such that the upper skin panel 190 and lower skin panel 192 are devoid of fabric plies 312.

In the outboard wing portion 156 of the wing assembly 120, the bead stiffeners 240 may be laid up to have a lower bending stiffness than the bending stiffness of the skin panel 190, 192 alone without bead stiffeners 240. In this regard, the step of laying up the bead stiffeners 240 may comprise laying up each bead stiffener 240 to have a bead bending stiffness that is approximately 40-60 percent (more preferably, 45-55 percent) of a combined bead-skin portion bending stiffness of the bead stiffener and a skin panel portion 270 to which the bead stiffener 240 is to be coupled, as described above. As shown in FIG. 26 and described above, the skin panel portion 270 may have a panel portion width 276 extending between midpoints 272 respectively located on opposite sides of the bead stiffener, as shown in the upper skin panel 190. Each midpoint 272 may be located midway between the bead stiffener and an immediately adjacent bead stiffener. Alternatively, the panel portion width 276 may extend between a spar on one side of the bead stiffener and, on an opposite side of the bead stiffener, a midpoint 272 between the bead stiffener and an immediately adjacent bead stiffener, as shown in the lower skin panel 192 of FIG. 26.

The method 400 may optionally include laying up the front spar 130 and/or the rear spar 132. As described above, the front spar 130 and the rear spar 132 each have a spar outer flange 140 on the upper side and lower side of the front spar 130 and the rear spar 132. The upper skin panel 190 and the lower skin panel 192 are respectively coupled to the spar outer flanges 140 of the front spar 130 and rear spar 132. The step of laying up the upper skin panel 190 and/or the lower skin panel 192 may include laying up one or more localized padup regions 198 on an inner side of at least one of the upper skin panel 190 and the lower skin panel 192 such that when coupled to the wing assembly 120. Each localized padup region 198 is comprised of one or more composite plies 310 (e.g., unidirectional plies 314). As shown in FIGS. 13-14, a padup region 198 may be laid up on the upper skin panel 190 and/or lower skin panel 192 at the chordwise location of the spar outer flanges 140 of the front spar 130 and/or the rear spar 132. Each padup region 198 may extend along a spanwise direction from the location of the stout wing rib 154 toward the wing tip 124.

Referring briefly FIG. 17, the process of laying up the padup regions 198 may include laying up the padup region 198 such that the panel thickness 196 of the upper skin panel 190 and/or the lower skin panel 192 gradually increases within a ramp region 200 toward a full thickness of the padup region 198 at the stout wing rib 154. As mentioned above, the ramp region 200 preferably increases the panel thickness 196 at a gradual rate. As described below, the front spar 130 and/or rear spar 132 may be laid up in a manner complementary to the padup regions 198. For example, the front spar 130 and the rear spar 132 may be laid up such that the spar outer flanges 140 have a flange thickness 142 that decreases with the increase in panel thickness 196 within the ramp region 200, as shown in FIG. 17 and described above.

Prior to coupling the upper skin panel 190 and lower skin panel 192 to the spars 130, 132 and wing ribs 152, 158, the method 400 may include coupling a plurality of stringers 210 (e.g., FIGS. 4-5) to the upper skin panel 190 and the lower skin panel 192 in a manner such that the stringers 210 are spaced apart from each other at a chordwise spacing 256.

As described above, each of the stringers 210 has a stringer flange 214, at least one stringer web 216 extending outwardly from the stringer flange 214, and a stringer runout 218 at the stringer terminal end of the stringer 210. At the stringer runout 218, the stringer web 216 may gradually decrease in height as a means to locally reduce the bending stiffness at the stringer runout 218 and thereby minimize peel-off loads. As mentioned above, the stringers 210 may be limited to the inboard wing portion 150. In this regard, the method may include extending the stringers 210 continuously along a spanwise direction from the wing root 122 to the stout wing rib 154 as shown in FIGS. 18-19.

Referring briefly FIG. 19, in some examples, the step of coupling stringers 210 to the upper skin panel 190 and/or the lower skin panel 192 may include coupling one or more stringer flanges 214 of each stringer 210 to a skin panel (e.g., the upper skin panel 190 or the lower skin panel 192) via a bondline 222. The bondline 222 may be the result of co-curing, co-bonding, or secondary bonding of the stringer flanges 214 to a skin panel using an adhesive layer 220. The method may include terminating the bondline 222 or adhesive layer 220 at a distance of no more than 0.50 inch from the stringer terminal end of the stringer 210 to define a flange-skin gap 224 between the stringer flange 214 and the skin panel. The method may include filling the flange-skin gap 224 with a non-adhesive gap filler 226 (e.g., a layer of fiberglass) that is non-binding to at least one of the stringer flange 214 and the skin panel, and thereby reducing or minimizing relatively high shear stresses 228 and pulloff stresses 230 that may otherwise occur in the bondline 222 if the bondline 222 extended all the way to the end of the stringer runout 218.

Referring still to FIG. 19, the laying up of the upper skin panel 190 and lower skin panel 192 may include laying up one or more localized padup regions 198 on the inner side of the upper skin panel 190 and/or the lower skin panel 192 such that when the upper skin panel 190 and/or lower skin panel 192 are coupled to the wing assembly 120, each padup region 198 is located proximate the stringer terminal end of one of the stringers 210 (i.e., at the stout wing rib 154). The localized padup regions 198 may be laid up such that the panel thickness 196 of the upper skin panel 190 and/or the lower skin panel 192 gradually increases within a ramp region 200 toward a full thickness of the padup region 198, similar to the above-described arrangement for the padup regions 198 for the front spar 130 and rear spar 132. Each stringer 210 may be laid up in a manner complementary to the padup regions 198 at the stringer terminal ends. For example as described above with regard to the spars 130, 132, the method may include laying up each stringer 210 such that the stringer flange 214 have a flange thickness 142 that decreases in proportion to the increase in panel thickness 196 within the ramp region 200, as shown in FIG. 19.

The method 400 may include positioning a plurality of inboard wing ribs 152 between the front spar 130 and the rear spar 132 and at spaced intervals between the wing root 122 and the stout wing rib 154. The plurality of inboard wing ribs 152 may define a plurality of inboard wing bays 153 between adjacent pairs of the inboard wing ribs 152. Each of the wing ribs may include a rib cutout 164 to allow for passage of the stringers 210 across the inboard wing bays 153.

Referring briefly FIG. 10, the method 400 may also include manufacturing the inboard wing ribs 152 and/or the outboard wing ribs 158 in a hybrid configuration. For example, the method may include laying up a plurality of fabric plies 312 (and not unidirectional plies 314) to result in a wing rib 152, 158 having a channel-shaped cross section. However, the wing ribs 152, 158 may be manufactured in alternative cross-sectional shapes, and are not limited to a channel-shaped cross section. As mentioned above, fabricating the wing ribs 152, 158 out of fabric plies 312 may avoid warpage and/or wrinkling that may otherwise occur with unidirectional plies 314. The channel-shaped cross-section of each wing rib 152, 158 may be made up of a rib web 162 interconnecting a pair of rib outer flanges 170. To improve the shear strength of the rib outer flanges 170, the method may include interleaving one or more 0-degree plies 316 within the fabric plies 312 of the rib outer flanges 170. The 0-degree plies 316 may be interleaved at an approximate mid-plane of each rib outer flange 170.

In a still further example, the wing ribs 152, 158 may each be manufactured in a multi-piece configuration similar to the above-described configuration of the front spar 130 shown in FIG. 7. For example, a plurality of fabric plies 312 may be laid up to result in a pair of rib chords 166 each having an L-shaped cross section comprised of a rib outer flange 170 and a rib inner flange 168 interconnected by a radius portion 144. The laying up of each rib chord 166 may include interleaving within each rib outer flange 170 one or more 0-degree plies 316 at the approximate mid-plane of the rib outer flange 170. The method may also include laying up a plurality of fabric plies 312 to form a rib web 162 having a generally planar shape. The method may include co-bonding the rib outer flange 170 of the pair of rib chords 166 respectively to the upper skin panel 190 and the lower skin panel 192. The method may optionally include mechanically fastening each rib outer flange 170 to the upper skin panel 190 or lower skin panel 192. The method may additionally include interconnecting the pair of rib chords 166 by coupling the rib web 162 to the rib inner flange 168 of each one of the rib chords 166 to result in the channel-shaped cross section of the outboard wing rib 158 coupled to the upper skin panel 190 and the lower skin panel 192. The rib web 162 may also be mechanically coupled to the rib inner flange 168 of each of the rib chords 166 similar to the above-described arrangement shown in FIG. 7.

The method 400 may include manufacturing the front spar 130 and/or the rear spar 132 by laying up a plurality of fabric plies 312 to result in a channel-shaped cross section having a spar web 134 and an opposing pair of spar outer flanges 140 similar to the above-described configuration of the inboard wing rib 152 shown in FIG. 10. The front spar 130 and/or the rear spar 132 may be manufactured in a hybrid configuration by interleaving one or more 0-degree plies 316 into the fabric plies 312 at the approximate mid-plane of each spar outer flange 140 as a means to increase the shear strength of the spar outer flanges 140. As described above, the 0-degree plies 316 are excluded from the radius portion 144 and the spar inner flange 138 of the spar chord 136 to avoid warpage and/or wrinkling that may otherwise occur in the L-shaped cross section of the spar chords 136.

The front spar 130 and/or the rear spar 132 may be manufactured in a multi-piece configuration similar to the above-described manufacturing of the wing ribs. For example, fabric plies 312 may be laid up in an L-shaped cross section to form a pair of spar chords 136 each having a spar outer flange 140 and a spar inner flange 138 interconnected by a radius portion 144. One or more 0-degree plies 316 may be interleaved into an approximate mid-plane of the spar outer flanges 140. The method may include laying up a plurality of fabric plies 312 to result in a spar web 134 which may be generally planar. The method may also include bonding and mechanically fastening the spar outer flange 140 of the pair of spar chords 136 respectively to the upper skin panel 190 and the lower skin panel 192, and interconnecting the pair of spar chords 136 by coupling (e.g., bonding and/or mechanically fastening) the spar web 134 to the spar inner flange 138 of each one of the spar chords 136 to result in the channel-shaped cross section of the front spar 130 or rear spar 132 coupled to the upper skin panel 190 and the lower skin panel 192 as shown in FIGS. 6-8.

Figure 31:
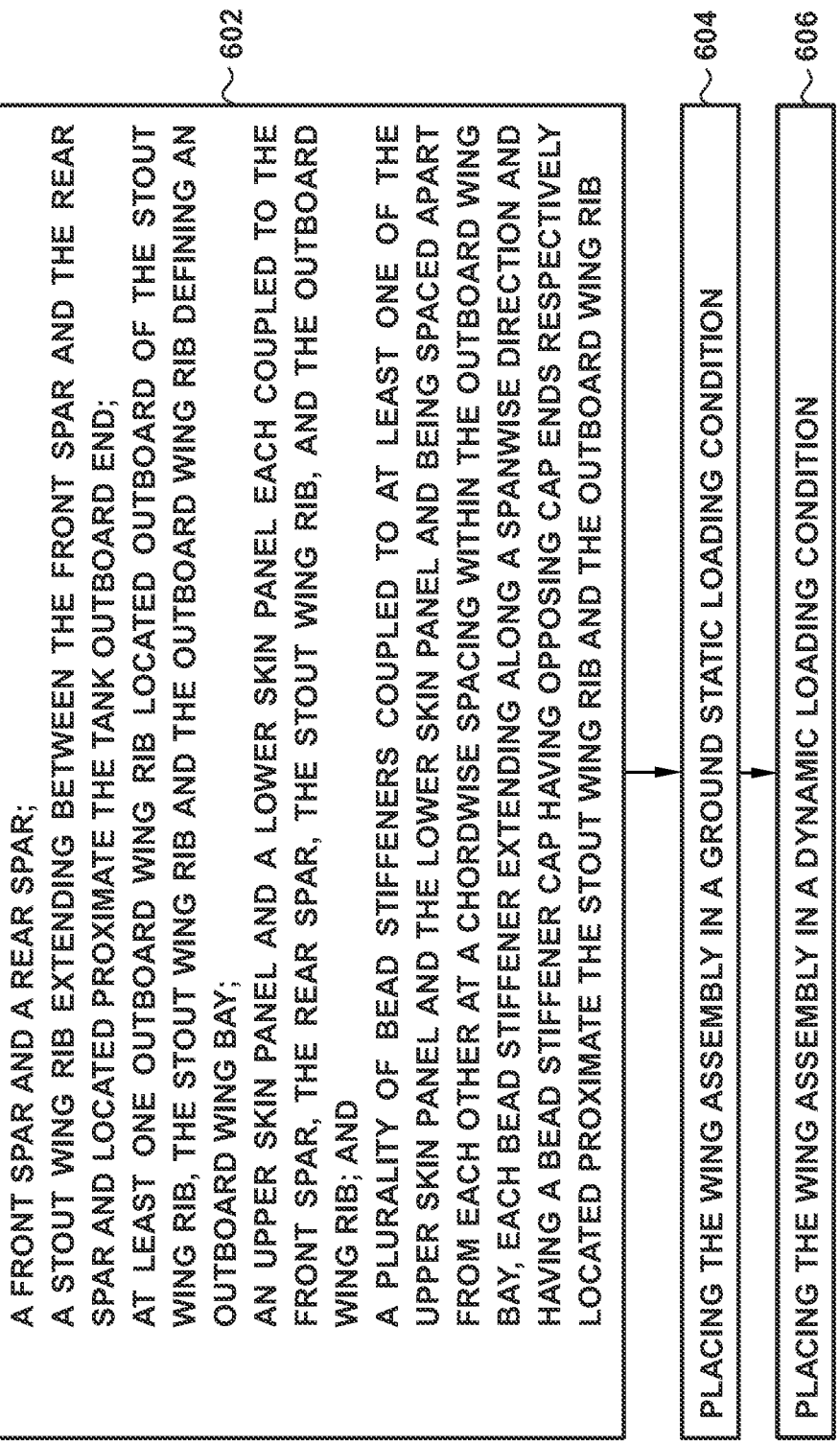
FIG. 31 is a flowchart of operations included in a method of loading a wing assembly.

Referring to FIG. 31, shown is a flowchart of operations included in a method 500 of loading a wing assembly 120 of an aircraft 100. The method includes step 502 of providing a wing assembly 120 which, as described above includes a front spar 130 and a rear spar 132 each extending along a spanwise direction from a wing root 122 toward a wing tip 124 of the wing assembly 120. In addition of the wing assembly 120 includes a stout wing rib 154 extending between the front spar 130 and the rear spar 132 and located proximate the tank outboard end 186. Furthermore, the wing assembly 120 includes at least one outboard wing rib 158 extending between the front spar 130 and the rear spar 132 and located outboard of the stout wing rib 154. As described above, the stout wing rib 154 and the outboard wing rib 158 define an outboard wing bay 160. The wing assembly 120 also includes an upper skin panel 190 and a lower skin panel 192 each coupled to the front spar 130, the rear spar 132, the stout wing rib 154, the inboard wing ribs 152, and the outboard wing ribs 158. Additionally, the outboard wing portion 156 of the wing assembly 120 includes a plurality of bead stiffeners 240 coupled to the upper skin panel 190 and/or the lower skin panel 192, and which are spaced apart from each other at a chordwise spacing 256 within the outboard wing bays 160. As described above, each bead stiffener 240 extends along a spanwise direction and has a bead stiffener cap 242 having opposing cap ends 244 respectively located proximate the stout wing rib 154 and the outboard wing ribs 158, and between adjacent pairs of outboard wing ribs 158.

The method 500 additionally includes step 504 of placing the wing assembly 120 in a ground static loading condition wherein the aircraft 100 may be substantially non-moving (e.g., parked at a gate of an airport) and/or may be under a ground static loading in which the wing assembly 120 is subjected to gravitational force due to the structural mass of the wing assembly 120. The method 500 additionally includes step 506 of placing the wing assembly 120 in a dynamic loading condition wherein the aircraft 100 may be in motion and the wing assembly 120 is subjected to one or more dynamic loads. For example, the aircraft 100 in motion may be subjected to gravitational force and inertial force due to the structural mass of the wing assembly 120, aerodynamic loads on the wing assembly 120 when the aircraft 100 is in flight, and/or control surface loads on the wing assembly 120 as a result of in-flight deflection of one or more flight control surfaces such as ailerons, flaps, and/or other control surfaces.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A wing assembly configured to include at least one fuel tank having a tank outboard end, comprising:

a front spar and a rear spar each extending along a spanwise direction from a wing root toward a wing tip of the wing assembly;

a stout wing rib extending between the front spar and the rear spar and located proximate the tank outboard end;

at least one outboard wing rib extending between the front spar and the rear spar and located outboard of the stout wing rib, the stout wing rib and the outboard wing rib defining an outboard wing bay;

an upper skin panel and a lower skin panel each coupled to the front spar, the rear spar, the stout wing rib, and the outboard wing rib;

a plurality of bead stiffeners coupled to at least one of the upper skin panel and the lower skin panel and being spaced apart from each other at a chordwise spacing within the outboard wing bay, each bead stiffener extending along a spanwise direction and having a bead stiffener cap having opposing cap ends respectively located proximate the stout wing rib and the outboard wing rib; and a plurality of stringers coupled to at least one of the upper skin panel and the lower skin panel, and located on an inboard side of the stout wing rib, the wing assembly being devoid of stringers on an outboard side of the stout wing rib, the stout wing rib having a strength capability that is higher than the strength capability of the outboard wing rib.

2. The wing assembly of claim 1, wherein:
at least one of the upper skin panel and the lower skin panel has a panel thickness that is constant along the spanwise direction from the stout wing rib toward the wing tip.

3. The wing assembly of claim 1, wherein:
the front spar and the rear spar each have a spar outer flange on each of an upper side and a lower side of the front spar and the rear spar, and to which the upper skin panel and the lower skin panel are respectively couplable; and
at least one of the upper skin panel and the lower skin panel has a panel thickness that locally increases to a padup region of increased thickness on an inner side of the skin panel at a chordwise location of at least one of the spar outer flanges of at least one of the front spar and the rear spar, each padup region extending along a spanwise direction from the stout wing rib toward the wing tip.

4. The wing assembly of claim 1, wherein:
the plurality of stringers are spaced apart from each other at a chordwise spacing between the front spar and the rear spar, at least one of the stringers extending continuously along a spanwise direction from the wing root and terminating at a stringer terminal end at the stout wing rib.

5. The wing assembly of claim 1, wherein:
each one of the stringers has a stringer flange, at least one stringer web extending outwardly from the stringer flange, and a stringer runout at the stringer terminal end of the stringer, the stringer web gradually decreasing in height;
the stringer flange being coupled to one of the upper skin panel and the lower skin panel via an adhesive layer; and
the adhesive layer terminating at a distance of no more than 0.50 inch from the stringer terminal end of the stringer and defining a stringer-skin gap between the stringer flange and the skin panel.

6. The wing assembly of claim 1, wherein:
the wing assembly has a plurality of outboard wing ribs at spaced locations between the stout wing rib and the wing tip, and defining a plurality of outboard wing bays between adjacent pairs of the outboard wing ribs;
each of the bead stiffeners has bead stiffener flanges for coupling the bead stiffener to the skin panel; and
the bead stiffener flanges of at least one of the bead stiffeners extend from one outboard wing bay, across at least one of the outboard wing ribs, and into at least one other outboard wing bay.

7. The wing assembly of claim 1, wherein:
the bead stiffener cap of at least some of the bead stiffeners has a rounded cross sectional shape.

8. The wing assembly of claim 1, wherein:
the bead stiffener cap of at least some of the bead stiffeners has a cross section that is constant along a lengthwise direction of the bead stiffener.

9. The wing assembly of claim 1, wherein:
each bead stiffener has a bead bending stiffness that is approximately 40-60 percent of a combined bead-skin portion bending stiffness of the bead stiffener and a skin panel portion of the upper skin panel or lower skin panel supported by the bead stiffener; and
the skin panel portion having a panel portion width defined as one of the following:
the panel portion width extending between midpoints respectively located on opposite sides of the bead stiffener, each midpoint located midway between the bead stiffener and an immediately adjacent bead stiffener;
the panel portion width extending between a spar on one side of the bead stiffener and, on an opposite side of the bead stiffener, a midpoint between the bead stiffener and an immediately adjacent bead stiffener.

10. A method of manufacturing a wing assembly, comprising:
positioning a stout wing rib between a front spar and a rear spar of a wing assembly configured to include at least one fuel tank having a tank outboard end, the front spar and the rear spar each extending along a spanwise direction from a wing root toward a wing tip of the wing assembly, the stout wing rib being positioned proximate a location of the tank outboard end;
positioning at least one outboard wing rib between the front spar and the rear spar and outboard of the stout wing rib, the stout wing rib and the outboard wing rib defining an outboard wing bay, the stout wing rib having a strength capability that is higher than the outboard wing rib;
coupling a plurality of bead stiffeners to at least one of an upper skin panel and a lower skin panel in a manner such that the bead stiffeners are spaced apart from each other at a chordwise spacing within the outboard wing bay and are each oriented along a spanwise direction and each have a bead stiffener cap having opposing cap ends that are respectively located proximate the stout wing rib and the outboard wing rib;
coupling a plurality of stringers to at least one of the upper skin panel and the lower skin panel on an inboard side of the stout wing rib, and omitting stringers on an outboard side of the stout wing rib; and
coupling the upper skin panel and the lower skin panel to the front spar, the rear spar, the stout wing rib, and the outboard wing rib.

11. The method of claim 10, further comprising:
laying up at least one of the upper skin panel and the lower skin panel such that when coupled to the wing assembly, a panel thickness of the upper skin panel and the lower skin panel is constant along the spanwise direction starting from a location of the stout wing rib toward the wing tip.

12. The method of claim 10, wherein the front spar and the rear spar each have a spar outer flange on each of an upper side and a lower side of the front spar and the rear spar, and to which the upper skin panel and the lower skin panel are respectively coupled, the step of laying up at least one of the upper skin panel and the lower skin panel including:
   laying up a padup region of increased thickness on an inner side of at least one of the upper skin panel and the lower skin panel such that when coupled to the wing assembly, the padup region is located at a chordwise location of at least one of the spar outer flanges of at least one of the front spar and the rear spar, and each padup region extends along a spanwise direction from the location of the stout wing rib toward the wing tip.

13. The method of claim 10, further comprising:
   coupling the plurality of stringers to at least one of the upper skin panel and the lower skin panel in a manner such that the stringers are spaced apart from each other at a chordwise spacing, and such that at least one of the stringers extends continuously along a spanwise direction from the wing root and terminating at a stringer terminal end at the stout wing rib.

14. The method of claim 13, wherein coupling the plurality of stringers to at least one of the upper skin panel and the lower skin panel comprises:
   coupling a stringer flange of at least one of the inboards stringers to the upper skin panel and the lower skin panel via an adhesive layer; and
   terminating the adhesive layer at a distance of no more than 0.50 inch from the stringer terminal end of the stringer to define a stringer-skin gap between the stringer flange and the skin panel.

15. The method of claim 10, further comprising:
   positioning a plurality of outboard wing ribs at spaced locations between the stout wing rib and the wing tip to define a plurality of outboard wing bays between adjacent pairs of the outboard wing ribs; and
   coupling the plurality of bead stiffeners to at least one of the upper skin panel and the lower skin panel in a manner such that bead stiffener flanges of at least one of the bead stiffeners extend from one outboard wing bay, across at least one of the outboard wing ribs, and into at least one other outboard wing bay.

16. The method of claim 10, further comprising:
   laying up each bead stiffener to include a bead stiffener cap having a rounded cross sectional shape.

17. The method of claim 10, further comprising:
   laying up each bead stiffener to have a bead stiffener cap having a cross section that is constant along a lengthwise direction of the bead stiffener.

18. The method of claim 10, further comprising:
   laying up each bead stiffener to have a bead bending stiffness that is approximately 40-60 percent of a combined bead-skin portion bending stiffness of the bead stiffener and a skin panel portion;
   the skin panel portion having a panel portion width defined as one of the following:
      the panel portion width extending between midpoints respectively located on opposite sides of the bead stiffener, each midpoint located midway between the bead stiffener and an immediately adjacent bead stiffener;
      the panel portion width extending between a spar on one side of the bead stiffener and, on an opposite side of the bead stiffener, a midpoint between the bead stiffener and an immediately adjacent bead stiffener.

19. A method of loading a wing assembly of an aircraft, comprising:
   providing a wing assembly configured to include at least one fuel tank having a tank outboard end, including:
      a front spar and a rear spar each extending along a spanwise direction from a wing root toward a wing tip of the wing assembly;
      a stout wing rib extending between the front spar and the rear spar and located proximate the tank outboard end;
      at least one outboard wing rib extending between the front spar and the rear spar and located outboard of the stout wing rib, the stout wing rib and the outboard wing rib defining an outboard wing bay, the stout wing rib having a strength capability that is higher than the strength capability of the outboard wing rib;
      an upper skin panel and a lower skin panel each coupled to the front spar, the rear spar, the stout wing rib, and the outboard wing rib; and
      a plurality of bead stiffeners coupled to at least one of the upper skin panel and the lower skin panel and being spaced apart from each other at a chordwise spacing within the outboard wing bay, each bead stiffener extending along a spanwise direction and having a bead stiffener cap having opposing cap ends respectively located proximate the stout wing rib and the outboard wing rib;
      a plurality of stringers coupled to at least one of the upper skin panel and the lower skin panel, and located on an inboard side of the stout wing rib, the wing assembly being devoid of stringers on an outboard side of the stout wing rib;
   placing the wing assembly in a ground static loading condition; and
   placing the wing assembly in a dynamic loading condition.

20. The method of claim 19, wherein:
   the ground static loading condition is associated with the aircraft substantially non-moving and under a ground static loading in which the wing assembly is subjected to gravitational force due to a structural mass of the wing assembly; and
   the dynamic loading condition is associated with the aircraft in motion and the wing assembly subjected to at least one of:
      gravitational force due to the structural mass of the wing assembly;
      inertial force due to the structural mass of the wing assembly;
      aerodynamic loads on the wing assembly; and
      control surface loads on the wing assembly.

21. A wing assembly configured to include at least one fuel tank having a tank outboard end, comprising:
   a front spar and a rear spar each extending along a spanwise direction from a wing root toward a wing tip of the wing assembly;
   a stout wing rib extending between the front spar and the rear spar and located proximate the tank outboard end;
   at least one outboard wing rib extending between the front spar and the rear spar and located outboard of the stout wing rib, the stout wing rib and the outboard wing rib defining an outboard wing bay;

an upper skin panel and a lower skin panel each coupled to the front spar, the rear spar, the stout wing rib, and the outboard wing rib;

a plurality of bead stiffeners coupled to at least one of the upper skin panel and the lower skin panel and being spaced apart from each other at a chordwise spacing within the outboard wing bay, each bead stiffener extending along a spanwise direction and having a bead stiffener cap having opposing cap ends respectively located proximate the stout wing rib and the outboard wing rib;

wherein each bead stiffener has a bead bending stiffness that is approximately 40-60 percent of a combined bead-skin portion bending stiffness of the bead stiffener and a skin panel portion of the upper skin panel or lower skin panel supported by the bead stiffener; and the skin panel portion has a panel portion width defined as one of the following:

the panel portion width extending between midpoints respectively located on opposite sides of the bead stiffener, each midpoint located midway between the bead stiffener and an immediately adjacent bead stiffener;

the panel portion width extending between a spar on one side of the bead stiffener and, on an opposite side of the bead stiffener, a midpoint between the bead stiffener and an immediately adjacent bead stiffener.

\* \* \* \* \*